United States Patent
Katsura

(10) Patent No.: US 11,027,599 B2
(45) Date of Patent: Jun. 8, 2021

(54) SYSTEMS, APPARATUS, AND METHODS TO ADJUST DIMMING ASSOCIATED WITH DUAL PANEL SUNROOFS

(71) Applicant: AISIN TECHNICAL CENTER OF AMERICA, INC., Northville, MI (US)

(72) Inventor: Shintaro Katsura, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 184 days.

(21) Appl. No.: 16/359,137

(22) Filed: Mar. 20, 2019

(65) Prior Publication Data
US 2020/0298678 A1   Sep. 24, 2020

(51) Int. Cl.
| | | |
|---|---|---|
| B60J 3/04 | (2006.01) |
| B60J 7/00 | (2006.01) |
| B60J 7/043 | (2006.01) |
| E06B 9/24 | (2006.01) |

(52) U.S. Cl.
CPC ............... B60J 3/04 (2013.01); B60J 7/0007 (2013.01); B60J 7/043 (2013.01); *E06B 2009/2464* (2013.01)

(58) Field of Classification Search
CPC .. B60J 3/04; B60J 7/0007; B60J 7/043; E02B 2009/2464
See application file for complete search history.

(56) References Cited

U.S. PATENT DOCUMENTS

| | | | |
|---|---|---|---|
| 5,830,529 A | 11/1998 | Ross | |
| 6,039,390 A * | 3/2000 | Agrawal | B32B 17/10036 296/211 |
| 6,669,278 B2 * | 12/2003 | Patelczyk | B60J 7/047 296/220.01 |
| 8,941,788 B2 | 1/2015 | Brecht et al. | |
| 9,409,464 B2 | 8/2016 | Tomkns et al. | |
| 9,707,830 B2 | 7/2017 | Okuda et al. | |
| 9,958,742 B2 | 5/2018 | Min et al. | |
| 2013/0242370 A1 | 9/2013 | Wang | |
| 2016/0261409 A1 | 9/2016 | Urase et al. | |
| 2020/0016963 A1 * | 1/2020 | Bomers | B32B 17/10504 |

FOREIGN PATENT DOCUMENTS

| | | |
|---|---|---|
| CN | 101414065 B | 9/2011 |
| CN | 105346443 B | 9/2017 |
| JP | 5515550 B2 | 6/2014 |

* cited by examiner

*Primary Examiner* — Marthe Y Marc-Coleman
(74) *Attorney, Agent, or Firm* — Oblon, McClelland, Maier & Neustadt, L.L.P.

(57) ABSTRACT

Systems, apparatus, and methods to adjust dimming associated with dual panel sunroof are disclosed. A disclosed sunroof dimming system for a vehicle includes a first dimmable panel of a sunroof and a second dimmable panel of the sunroof. The first dimmable panel is moveable relative to the second dimmable panel to open or close the sunroof. The sunroof dimming system also includes a controller operatively coupled to the first and second dimmable panels. The controller is configured to adjust dimming associated with the first and second dimmable panels to maintain a brightness of an external light associated with a vehicle cabin that is experienced by a vehicle occupant when the sunroof changes between a closed state and an open state.

15 Claims, 10 Drawing Sheets

SYSTEMS, APPARATUS, AND METHODS TO ADJUST DIMMING ASSOCIATED WITH DUAL PANEL SUNROOFS

FIELD OF THE DISCLOSURE

This disclosure relates generally to vehicles and, more particularly, to systems, apparatus, and methods to adjust dimming associated with dual panel sunroofs.

BACKGROUND

Motor vehicles typically employ sunroofs including dimmable panels (e.g., electrochromic panels) that have controllable dimming functionality. For example, a panel is configured to dim based on a voltage applied to the panel (e.g., when sunlight passing through the panel is relatively bright and/or intense). When in a dimmed state, such panels are advantageously used to scatter light and/or otherwise reduce an amount of sunlight that would have otherwise entered a vehicle cabin, which prevents vehicle drivers from being dazzled by the sun as well as cools the vehicle cabin. As a result, these sunroof panels improve vehicle safety as well as driver comfort

SUMMARY

An example sunroof dimming system for a vehicle includes a first dimmable panel of a sunroof and a second dimmable panel of the sunroof. The first dimmable panel is moveable relative to the second dimmable panel to open or close the sunroof. The sunroof dimming system also includes a controller operatively coupled to the first and second dimmable panels. The controller is configured to adjust dimming associated with the first and second dimmable panels to maintain a brightness of an external light associated with a vehicle cabin that is experienced by a vehicle occupant when the sunroof changes between a closed state and an open state An example apparatus includes a sunroof controller. The sunroof controller is configured to control dimming of a first panel of a sunroof and a second panel of a sunroof. The sunroof controller is also configured to move, via a motor, the first panel relative to the second panel from a first position to a second position in which the first panel at least partially overlaps with the second panel. Each of the first and second panels is in a first visual state when the first panel is in the first position. The sunroof controller is also configured to adjust dimming of the first and second panels such that, when the first panel is in the second position, each of the first and second panels is in a second visual state different relative to the first visual state.

An example tangible machine-readable storage medium includes instructions that, when executed, cause a processor to at least move, via a motor, the first panel relative to the second panel from a first position to a second position in which the first panel at least partially overlaps with the second panel. Each of the first and second panels is in a first visual state when the first panel is in the first position. When executed, the instructions also cause the processor to at least adjust dimming of the first and second panels such that, when the first panel is in the second position, each of the first and second panels is in a second visual state different relative to the first visual state.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1:
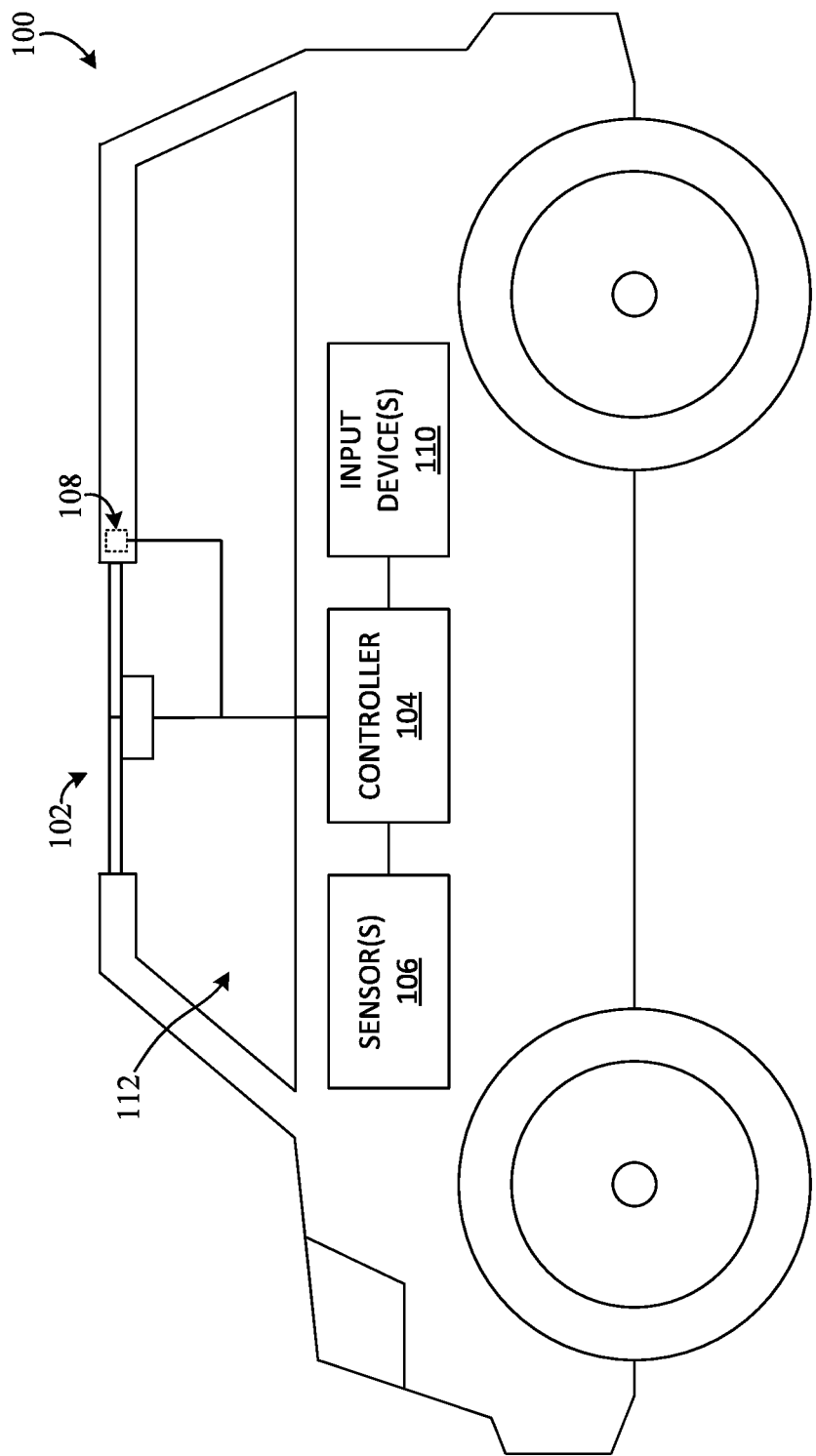
FIG. 1 is a view of an example vehicle in which examples disclosed herein can be implemented.

Some known sunroof dimming systems are configured to dim a sunroof panel in response to a user touching the panel or otherwise providing input to a button or switch connected to the panel. Further, some other known sunroof dimming systems are configured to automatically dim a sunroof panel based on detected lighting conditions within a vehicle cabin and/or external to a vehicle. However, such known sunroof dimming systems do not adjust dimming associated with a sunroof (e.g., a dual panel sunroof) in response to the sunroof changing between a closed state and an open state (e.g., when one dimmable sunroof panel moves relative to another dimmable sunroof panel). For example, when a first dimmed panel of the sunroof moves (e.g., tilts, raises, and/or slides) to overlap with a second dimmed panel of the sunroof, the first and second panels substantially and/or excessively reduce sunlight brightness that is perceived by a vehicle occupant as a result of these known systems maintaining visual states of the first and second panels during such a transition. That is, for these known sunroof dimming systems, the sunlight may appear brighter to the vehicle occupant when the sunroof is in the closed state (i.e., when the first panel does not overlap with the second panel) compared to when the sunroof is in the open state (e.g., when the first panel at least partially overlaps with the second panel). Thus, when the vehicle sunroof changes between the open state and the closed state, these known sunroof dimming systems fail to sufficiently maintain sunlight light intensity existing within the cabin (i.e., the light intensity substantially fluctuates) and, thus, fail to sufficiently maintain sunlight light brightness that is experienced by the vehicle occupant(s) (i.e., the light brightness substantially fluctuates). As a result, these known sunroof dimming systems may leave at least a space (e.g., a space occupied by a vehicle occupant) of a vehicle cabin excessively dim and/or bright during or after such transition(s) of a sunroof, which may be undesirable to a driver or other vehicle occupants.

Systems, apparatus, and methods to adjust dimming associated with dual panel sunroofs are disclosed. Examples disclosed herein provide an example sunroof dimming system that includes a first example panel of a vehicle sunroof and a second example panel of the vehicle sunroof, each of which is dimmable. The first disclosed panel is configured to move (e.g., via a motor operatively coupled to the first panel) relative to the second disclosed panel to open and/or close the sunroof. The example sunroof dimming system also includes an example controller (e.g., a sunroof control module or unit) communicatively coupled to the first and second panels and configured to control dimming functionality associated with the first and second panels. In some examples, the controller controls the first and second panels to provide first visual states (e.g., partially or slightly dim states) of the respective first and second panels (e.g., the first and second panels have substantially the same transparency, tint, color, etc.) when the sunroof is in a closed state, for example, based on detected lighting conditions associated with a vehicle and/or detected user input(s) or selections. In such examples, when the sunroof is in the closed state, the first and second panels are in an unstacked position such that the first panel does not overlap with the second panel. On the other hand, when the sunroof is in an open state, the first and second panels are in a stacked position such that the first panel at least partially overlaps with the second panel (e.g., the first panel is positioned over or under the second panel).

In particular, in response to the sunroof changing between the closed state and an open state during certain driving conditions, the disclosed controller is configured to adjust dimming associated with the first panel and/or the second panel to maintain a light intensity within a vehicle cabin, as discussed in greater detail below in connection with FIGS. 1-3, 4A, 4B, and 5-9. That is, in some examples, the controller controls the first and second panels to change the respective visual states thereof (e.g., to adjusted states) before, during, and/or after the sunroof changes between the closed and open states. In such examples, the controller adjusts dimming by causing visual characteristics associated with the respective first and second panels to change, which affects light passing through the first and second panels. For example, the controller increases voltage provided to the first panel and/or the second panel in response to the sunroof changing from the closed state to the open state, thereby increasing a transparency associated with the first panel and/or a transparency associated with the second panel. Conversely, in another example, the controller decreases the voltage provided to the first panel and/or the second panel in response to the sunroof changing from the open state to the closed state, thereby decreasing the transparency associated with the first panel and/or the transparency associated with the second panel. In this manner, the disclosed controller substantially maintains light brightness experienced by one or more vehicle occupant(s) during or after such transition(s) of the sunroof, which would have otherwise been unattainable using the above-mentioned known sunroof dimming systems. As a result, the disclosed controller improves user comfort by reducing, mitigating, and/or eliminating light fluctuations typically associated with opening and/or closing a vehicle sunroof.

FIG. 1 is a view of an example vehicle (e.g., a car, a van, a truck, a sport utility vehicle (SUV), etc.) 100 in which examples disclosed herein can be implemented. According to the illustrated example of FIG. 1, the vehicle 100 includes an example sunroof 102, an example controller 104, one or more example sensors 106, one or more example motors 108, and one or more example input devices 110. In particular, the controller 104 is structured and/or configured to control dimming functionality associated with the sunroof 102, as discussed further below in connection with FIGS. 2, 3, 4A, 4B and 5-9.

The controller 104 of FIG. 1 can be implemented, for example, using one or more electronic control units (ECUs) operatively coupled to the vehicle 100. The controller 104 of FIG. 1 is sometimes referred to as a sunroof controller. In particular, the controller 104 is communicatively coupled to one or more (e.g., all) of the sunroof 102, the sensor(s) 106, the motor(s) 108, and/or the input device(s) 110, for example, via a transmission or signal wire, a bus (e.g., a control area network (CAN)), radio frequency, etc. In some examples, the controller 104 receives sensor data from the sensor(s) 106. Further, in some examples, the controller 104 provides power and/or one or more control signals or commands to the motor(s) 108, thereby controlling the motor(s) 108 and/or an output thereof (e.g., a torque and/or a force). Further, in some examples, the controller 104 receives user data and/or inputs or selections from the input device(s) 110.

The sunroof 102 of FIG. 1 can be implemented, for example, using one or more of a panoramic sunroof, a pop-up sunroof, a sliding sunroof, a spoiler sunroof, etc. In particular, the sunroof 102 has dimming functionality associated therewith, which affects (e.g., absorbs, reflects, scatters, and/or otherwise blocks) an external light (e.g., sunlight) that passes through the sunroof 102 and into a cabin 112 of the vehicle 100. Additionally, the sunroof 102 is structured and/or configured to open and/or close, for examples, in response to receiving the output of the motor(s) 108. As such, at least a portion (e.g., a sunroof panel) of the sunroof 102 is operatively coupled to the motor(s) 108 such that the motor(s) 108 can control movement associated with the portion of the sunroof 102.

The sensor(s) 106 of FIG. 1 include one or more light detectors (e.g., one of a photometer, a light meter, a spectrometer, etc.) and/or any other suitable sensor that enables or facilitates functionality for the vehicle 100, improve vehicle performance, improve vehicle safety, and/or improve user comfort. In some examples, the sensor(s) 106 generate and/or otherwise provide data associated with the vehicle 100 and/or the external light such as, for example, sensor data that is indicative of light intensity associated with the external light within the vehicle cabin 112 and/or external to the vehicle 100. For example, the controller 104 detects, via the light detector(s), the intensity associated with the external light. Further, in some such examples, the controller 104 repeatedly and/or continuously detects such light intensity.

The motor(s) 108 of FIG. 1 can be implemented, for example, using one or more electric motors. In particular, the motor(s) 108 are operatively coupled to the sunroof 102 to facilitate opening and/or closing the sunroof 102. For example, in response to receiving the power and/or the control signal(s) or command(s) from the controller 104, the motor(s) 108 cause the sunroof 102 to open and/or close.

The input device(s) 110 of FIG. 1 can be implemented, for example, using one or more a button, a switch, a touch screen, a microphone, a voice command system, etc. In particular, the input device(s) are communicatively coupled to the controller 104 to generate and/or otherwise provide user selection(s) and/or user data to the controller 104. As such, the input device(s) 110 facilitate interactions and/or communications between one or more end users (e.g., a driver, a passenger, etc.) and the controller 104. In some examples, to facilitate dimming control associated with the sunroof 102, an end user provides corresponding selection(s) to and/or otherwise interacts with the input device(s) 110. Further, in some examples, to facilitate opening and/or closing the sunroof 102, the end user provides corresponding selection(s) to and/or otherwise interacts with the input device(s) 110.

Figure 2:
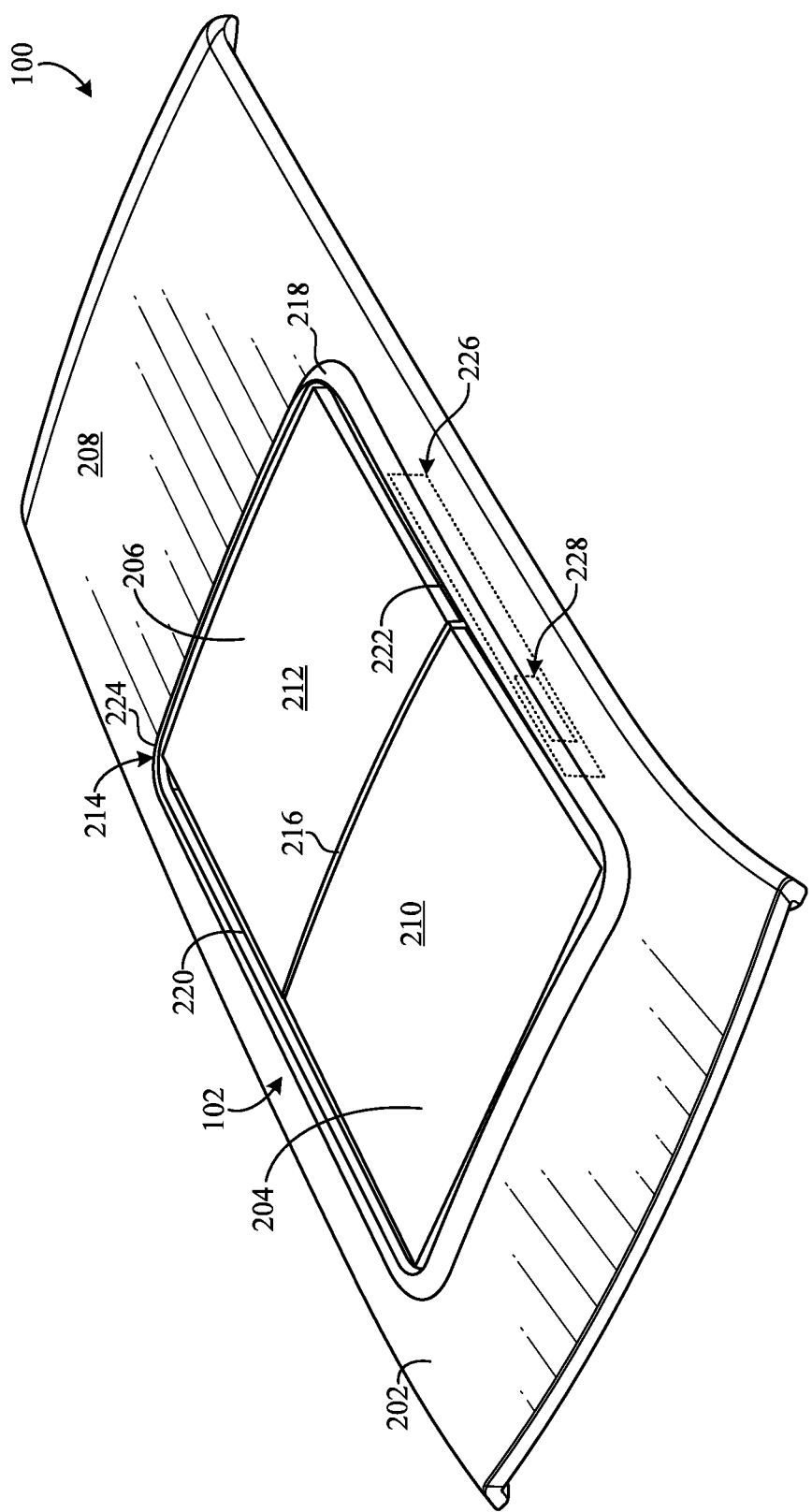
FIG. 2 is a partial-view of the example vehicle of FIG. 1 and shows an example vehicle sunroof in accordance with the teachings of this disclosure.

FIG. 2 is a partial-view of the vehicle 100 and shows the sunroof 102. As shown in FIG. 2, the sunroof 102 is positioned on and/or coupled to a roof 202 of the vehicle 100, for example, via one or more example fasteners and/or one or more example fastening methods or techniques. According to the illustrated example of FIG. 2, the sunroof 102 includes one or more example dimmable panels 204, 206, two of which are shown in this example (i.e., a first dimmable panel 204 and a second dimmable panel 206). As shown in FIG. 2, the sunroof 102 is in a closed state whereby the first panel 204 is in a first position (e.g., lowered position) thereof. When in the closed state, the sunroof 102 substantially isolates the vehicle cabin 112 from an outside environment. For example, the sunroof 102 and the vehicle roof 202 may form a fluid seal to prevent fluid(s) (e.g., air, water, etc.) and/or foreign matter from entering the vehicle cabin 112 when the sunroof 102 is in the closed state.

In some examples, the first panel 204 and/or at least a portion thereof is constructed of one or more electrochromic materials (e.g., electrochromic glass) and/or any other similar or appropriate material that provides sufficient adjustable dimming functionality to the first panel 204. Additionally, at least a portion of first panel 204 may be constructed of one or more other materials that are sufficiently transparent such as, for example, glass. Further, in some examples, the second panel 206 and/or at least a portion thereof is constructed of the electrochromic material(s) and/or any other similar or appropriate material that provides sufficient adjustable dimming functionality to the second panel 206. Additionally, at least a portion of second panel 206 may be constructed of the other material(s) that are sufficiently transparent. In particular, the controller 104 is communicatively coupled to the first panel 204 and the second panel 206 to control dimming functionality associated with the first panel 204 and dimming functionality associated with the second panel 206, for example, via adjusting voltage, current, and/or electrical power provided and/or applied to the panel(s) 204, 206.

In some examples, the vehicle roof 202 and the first and second panels 204, 206 at least partially define an exterior surface 208 of the vehicle 100. As shown in FIG. 2, the first and second panels 204, 206 include respective first and second example surfaces (e.g., outer surfaces) 210, 212. In some examples, the first and second surfaces 210, 212 are substantially adjacent and/or parallel to each other when the sunroof 102 is in the closed state (i.e., when the first panel 204 is in the first position thereof). That is, the first and second surfaces 210, 212 substantially form a single plane and/or a substantially smooth or continuous surface when the first panel 204 is in the first position.

According to the illustrated example of FIG. 2, the vehicle roof 202 includes an example aperture 214 disposed on the exterior surface 208 within which the sunroof 102 is at least partially positioned. In some examples, to prevent the fluid(s) (e.g., air, water, etc.) and/or foreign matter from entering the vehicle cabin (e.g., via the aperture 214), the sunroof 102 includes one or more example sunroof seals (e.g., one or more trim seals) 216, 218, two of which are shown in this example (i.e., a first sunroof seal 216 and a second sunroof seal 218). The first seal 216 is interposed between the first and second panels 204, 206 and is sized, shaped, structured, and/or otherwise configured to sealingly engage the first and second panels 204, 206 when the sunroof 102 is in the closed state. That is, in such examples, the first seal 216 and the first and second panels 204, 206 form a fluid seal, thereby preventing such fluid(s) and/or foreign matter from passing between the first and second panels 204, 206. As shown in FIG. 2, the first seal 216 extends from a first side 220 of the second seal 218 to a second side 222 of the second seal 218 opposite the first side 220.

In some examples, the second seal 218 extends around an example perimeter or edge 224 of the vehicle roof 202 that forms and/or defines the aperture 214. In particular, the second seal 218 is sized, shaped, structured, and/or otherwise configured to sealingly engage the roof 202 and the panel(s) 204, 206 to form another fluid seal, thereby preventing such fluid(s) and/or foreign matter from passing between the roof 202 and the panel(s) 204, 206. In some examples, when the sunroof 102 is in the closed state, the second seal 218 seals both the first and second panels 204, 206, as shown in FIG. 2. However, when the sunroof 102 is in an open state, the second seal 218 seals only the second panel 206.

In particular, the first panel 204 of FIG. 2 is moveable from the first position to a second example position (e.g., a raised position and/or a tilted position) to provide the open state of the sunroof 102. In some examples, the sunroof 102 includes an example sunroof guide system 226 (as represented by dotted/dashed lines of FIG. 2) that is operatively coupled to the first panel 204 and structured and/or configured to guide movement of the first panel 204 between the first and second positions. In such examples, the sunroof guide system 226 includes and/or is otherwise implemented using, for example, any of one or more rails, one or more guide blocks, one or more brackets, etc., and/or any other appropriate sunroof component associated with guiding movement of the first panel 204 and/or supporting the first panel 204. Additionally, in some examples, the sunroof 102 also includes an example sunroof actuator system 228 (as represented by dotted/dashed lines of FIG. 2) that is operatively coupled to the first panel 204 and structured and/or configured to move the first panel 204 cooperatively with the guide system 226, for example, based on output from the motor(s) 108. In such examples, the sunroof actuator system 228 includes and/or is implemented using, for example, any of one or more moveable shoes, one or more rotatable links, etc., and/or any other appropriate sunroof component associated with controlling movement of the first panel 204. In particular, the motor(s) 108 are operatively coupled to at least a portion (e.g., a moveable shoe) of the actuator system 228, for example, via a cable, a belt, etc. that extends from the motor(s) 108 to the portion of the actuator system 228 and is configured to transfer the motor output therebetween.

In some examples, when the first panel 204 is in the second position (i.e., the sunroof 102 is in the open state), the first and second panels 204, 206 are considered to be in a stacked position. On the other hand, when the first panel 204 is in the first position (i.e., the sunroof 102 is in the closed state), the first and second panels 204, 206 are considered to be in an unstacked position.

Figure 3:
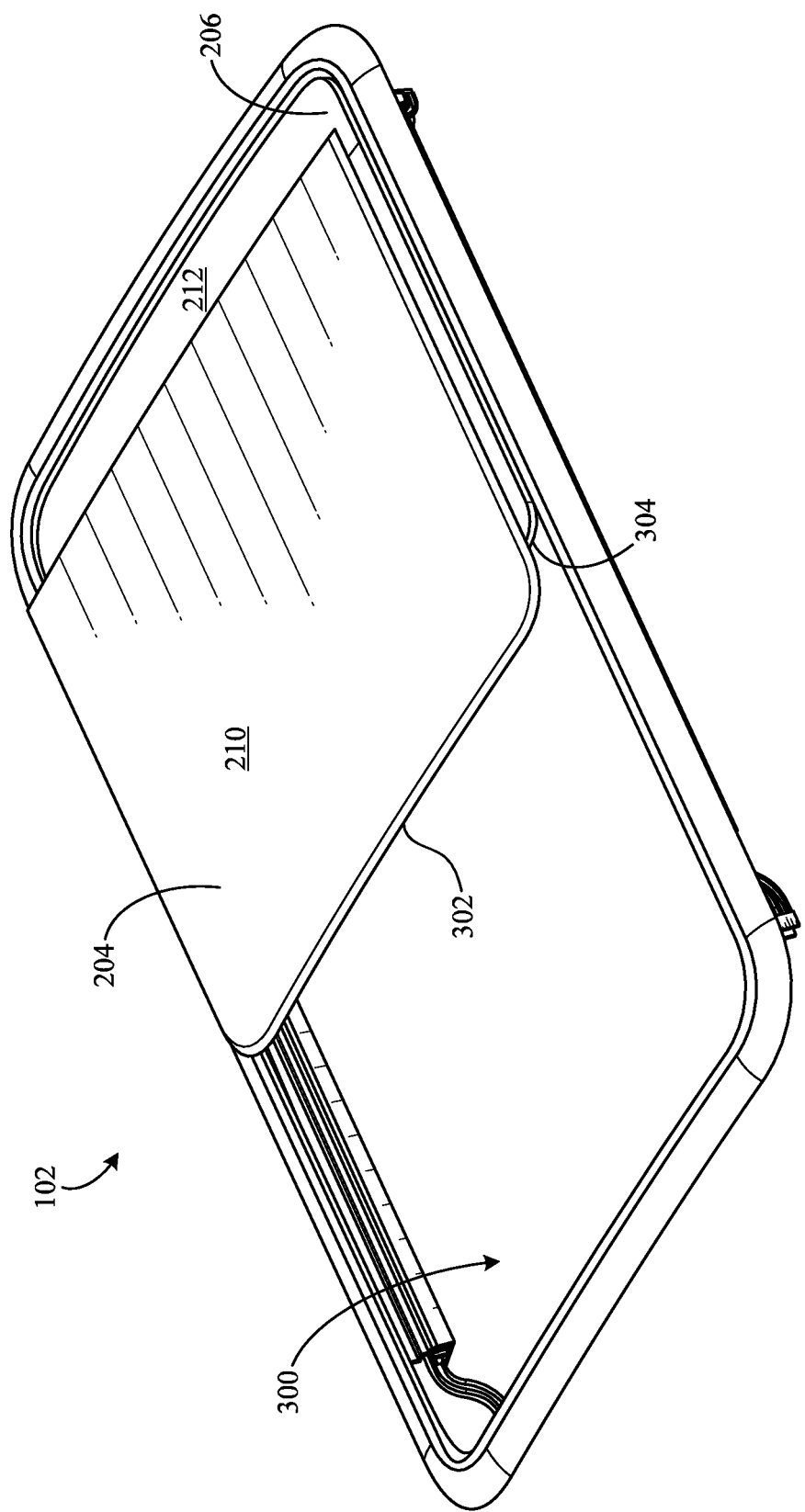
FIG. 3 is a view of the example vehicle sunroof of FIG. 2 and show the example sunroof of FIG. 2 in an open state.

FIG. 3 is a view of the sunroof 102 and shows the sunroof 102 in the open state. When in the open state, the sunroof 102 substantially exposes the vehicle cabin 112 to an outside environment. For example, the fluid(s) may pass into the vehicle cabin 112 through an example opening 300 associated with the sunroof 102 resulting from the first panel 204 moving away from the first position thereof. In particular, the first panel 204 of FIG. 3 is in the second position thereof. In some examples, when in the second position, the first panel 204 is aligned to the second panel 206 such that the first panel 204 covers substantially all of the second panel 206. In such examples, the first panel 204 includes an end (e.g., an edge) 302 that is proximate to an end (e.g., an edge) 304 of the second panel 206. However, in some examples, the first panel 204 at least partially covers and/or, more generally, at least partially overlaps with the second panel 206 when the first panel 204 is in the second position.

In some examples, the first and second panels 204, 206 are substantially parallel relative to each other when the first panel 204 is in the second position, as shown in FIG. 3. That is, when the first and second panels 204, 206 are substantially parallel relative to each other, the first and second panel surfaces 210, 212 form and/or define an example angle (e.g., an angle between about −10 degrees and about 10 degrees). However, in some examples, when the first panel 204 is in the second position, the first panel 204 and the second panel 206 may not be parallel to each other. That is, in such examples, the first panel 204 is at least partially tilted relative to the second panel 206 when the first panel 204 is in the second position such that the outer surfaces 210, 212 form another example angle (e.g., a relatively small angle such as 10 degrees, 15 degrees, 30 degrees, etc.).

Figure 4A:
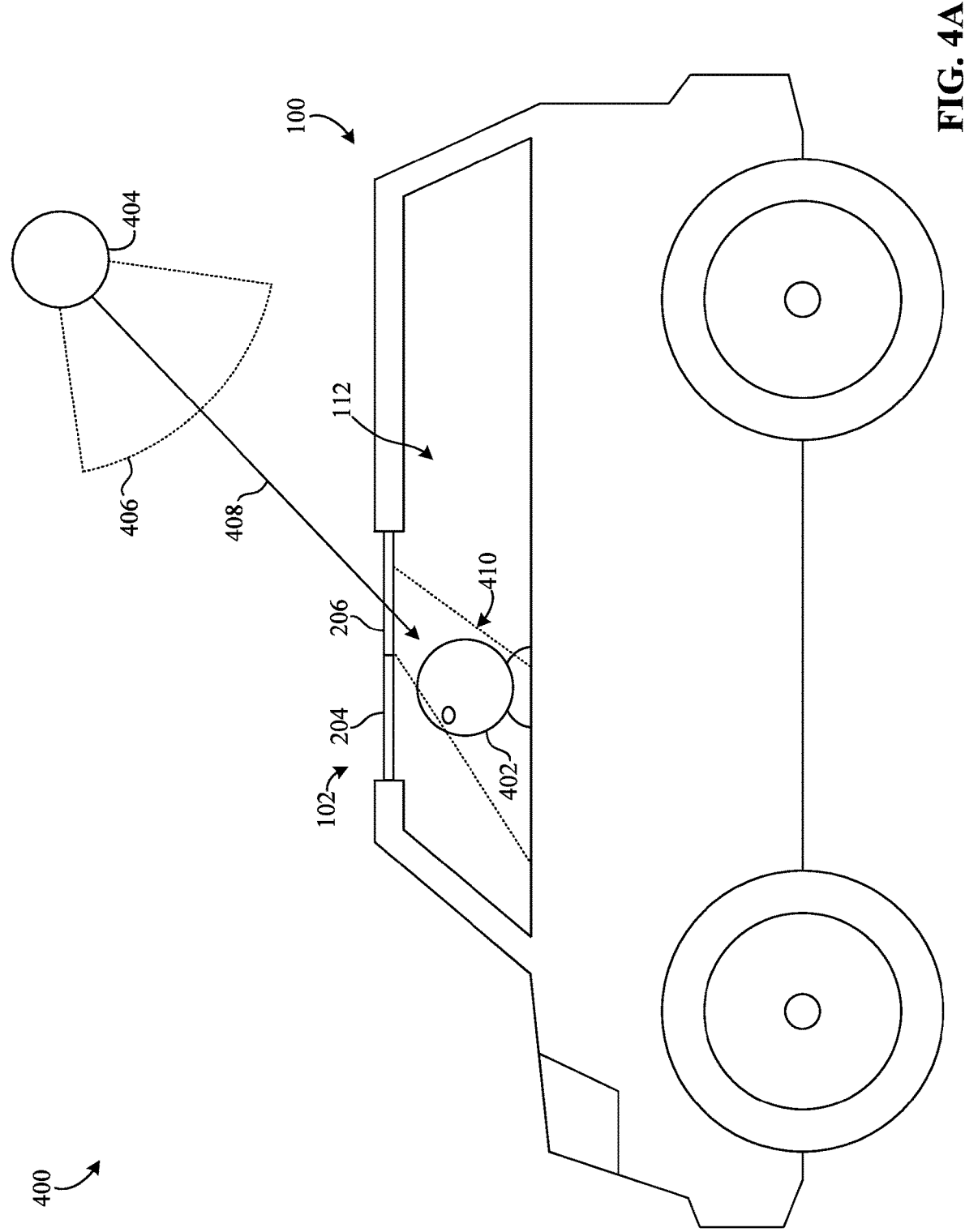
FIGS. 4A and 4B are other views of the example vehicle of FIG. 1 and show an example lighting event encountered by a vehicle occupant.
Figure 4B:
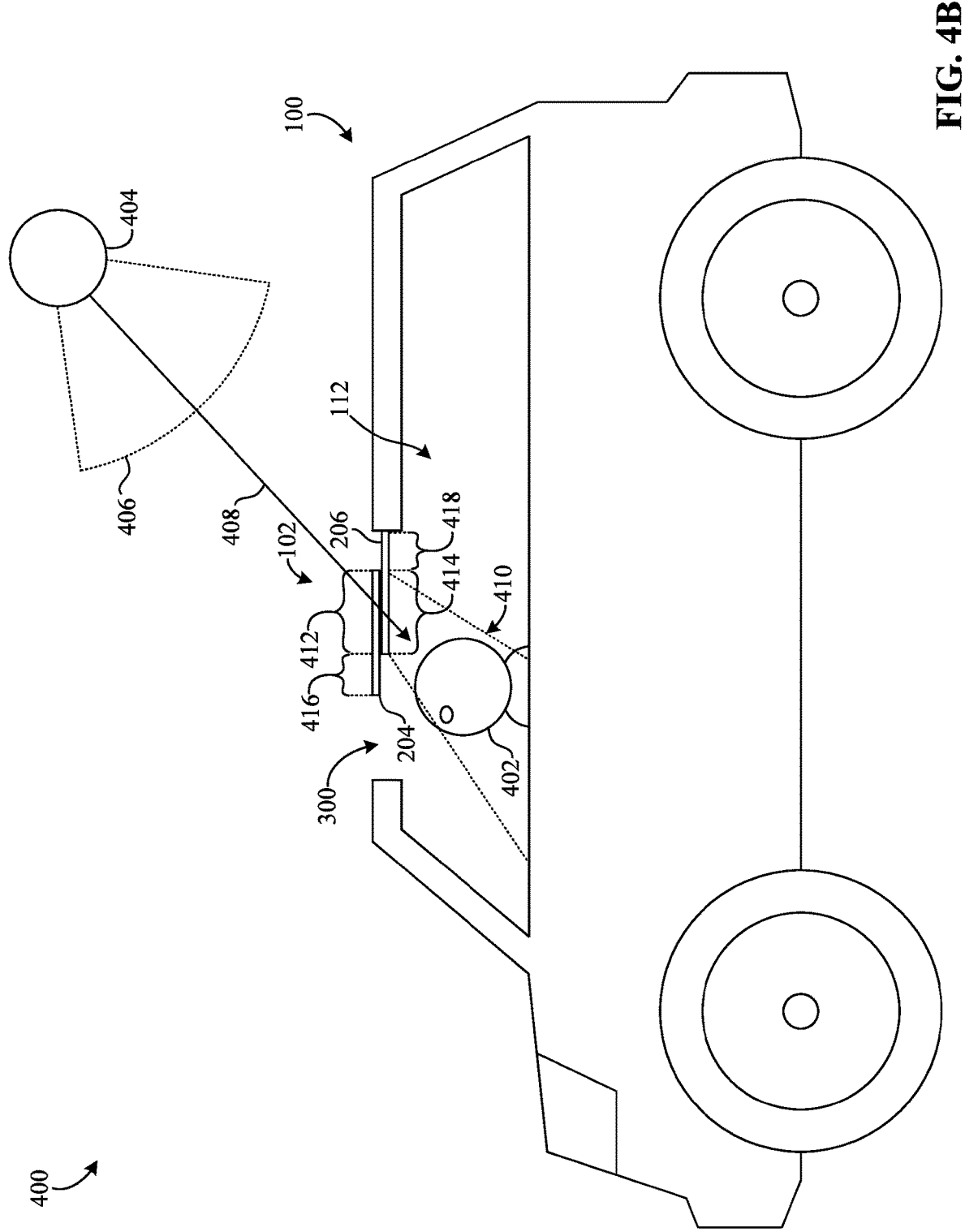

FIGS. 4A and 4B are other views of the vehicle 100 of FIG. 1 and show an example lighting event 400 encountered by a vehicle occupant (e.g., a driver) 402. According to the illustrated examples of FIGS. 4A and 4B, an example light source (e.g., the sun) 404 external to the vehicle 100 is affecting the vehicle occupant 402 of the vehicle 100 via the first panel 204 and the second panel 206. That is, the vehicle occupant 402 is exposed, via the first and second sunroof panels 204, 206, to an example light (e.g., sunlight) 406 generated by and/or emitted from the light source 404.

According to the illustrated example of FIG. 4A, the vehicle sunroof 102 is in the closed state. As such, the first sunroof panel 204 of FIG. 4A is in the first position thereof. Further, as shown in FIG. 4A, the light 406 includes a particular portion (e.g., one or more beams) 408 that is passing through the second panel 206 but not first panel 204, which is sometimes referred to as a light portion. That is, the portion 408 is entering the vehicle cabin 112 via the second panel 206. As used herein, the term "external light" refers to the light 406 and/or the portion 408 of the light 406. In particular, the light portion 408 is passing through an example space 410 (as represented by the dotted/dashed lines in FIG. 4A) within and/or defined by the vehicle cabin 112, which is occupied by the vehicle occupant 402 in this example. As a result, such external light 406, 408 may dazzle the vehicle occupant 402 and/or cause the vehicle cabin 112 to become relatively bright and/or hot, which may be undesirable to and/or adversely affect (e.g., distract, irritate, etc.) the vehicle occupant 402.

In some examples, the controller 104 controls dimming of the first panel 204 when the sunroof 102 is in the closed state, thereby providing a first visual state (e.g., a slightly dim state) of the first panel 204 in which the first panel 204 is associated with a first visual characteristic (e.g., a particular transparency, a particular tint, a particular color, etc.). Further, in such examples, the controller 104 controls dimming of the second panel 206 when the sunroof 102 is in the closed state, thereby providing a first visual state (e.g., a slightly dim state) of the second panel 206 in which the second panel 206 is associated with a first visual characteristic (e.g., a particular transparency, a particular tint, a particular color, etc.). In some examples, the first visual characteristic associated with the first panel 204 is substantially similar or the same relative to the first visual characteristic associated with the second panel 206. As a result, each of the first panel 204 and the second panel 206 of FIG. 4A absorbs, reflect, scatters, and/or otherwise blocks a particular amount of the external light 406, 408 that would have otherwise entered the vehicle cabin 112. In this manner, when the sunroof 102 is in the closed state, the controller 104 reduces a light brightness associated with the light portion 408 that is experienced by the vehicle occupant 402 during the lighting event 400 and/or, more generally, reduces an intensity of the light portion 408 that exists within the cabin space 410 when the first panel 204 is in the first position during the lighting event 400.

In some examples, the first visual characteristic associated with the first panel 204 is predetermined. In such examples, the vehicle occupant 402 selects the first visual characteristic associated with the first panel 204, for example, via interacting with the input device(s) 110. Additionally or alternatively, in some examples, the first visual characteristic associated with the second panel 206 is predetermined. In such examples, the vehicle occupant 402 selects the first visual characteristic associated with the second panel 206, for example, via interacting with the input device(s) 110.

In some examples, to facilitate controlling the dimmable sunroof panels 204, 206, the controller 104 detects a first intensity associated with the light portion 408 that corresponds to and/or exists within the space 410 when the first panel 204 is in the first position (i.e., when the sunroof 102 is in the closed state), for example, via the sensor(s) 106. In such examples, at least one of the sensor(s) 106 (e.g., a light detector) is positioned within the vehicle cabin 112 in or near the space 410 to obtain data indicative of the first intensity. In particular, in such examples, the controller 104 detects the first light intensity when the first and second panels 204, 206 are in the respective first visual states thereof, which provides a reference to the controller 104 and/or enables the controller 104 to determine one or more dimming adjustments for the panels 204, 206 associated with maintaining such light brightness.

According to the illustrated example of FIG. 4B, the vehicle sunroof 102 is in the open state. As such, the first sunroof panel 204 of FIG. 4B is in the second position thereof, which provides the opening 300. Unlike in the illustrated example of FIG. 4A, the light portion 408 of FIG. 4B is passing through the first panel 204 and the second panel 206. As a result, when the first and second panels 204, 206 of FIG. 4B are in the respective first visual states and the first panel 204 is in the first position, the first and second panels 204, 206 absorb, reflect, scatter, and/or otherwise block more of the external light 406, 408 compared to when the first and second panels 204, 206 are in the respective first visual states and the first panel 204 is in the first position. That is, if the first panel 204 substantially remains in the first visual state and the second panel substantially remains in the first visual state when the sunroof 102 changes from the closed state to the open state, the first and second panels 204, 206 may excessively reduce light brightness experienced by the vehicle occupant 402 and/or light intensity within the vehicle cabin 112, which may be undesirable to the vehicle occupant 402 during the lighting event 400.

In particular, to prevent and/or counteract such undesired dimming, the controller 104 is structured and/or configured to adjust dimming (e.g., change transparency associated with the panel(s) 204, 206) of the first panel 204 and/or the second panel 206, for example, when the first panel 204 is moving (e.g., between the first positon to the second position) and/or when the first panel 204 is stopped (e.g., in the first position or the second position). In this manner, the controller 104 maintains the light brightness associated with the light portion 408 that is experienced by the vehicle occupant 402 during the lighting event 400 when the sunroof 102 changes between the closed and open states. More generally, in this manner, the controller 104 maintains the intensity of the light portion 408 that exists within the space 410 of the vehicle cabin 112 during the lighting event 400 when the sunroof 102 changes between the open and closed states. As a result, the vehicle occupant 402 is exposed to substantially the same degree of light intensity associated with the light portion 408 and/or the cabin space 410 when the first panel 204 is in the second position compared to when the first panel 204 is in the first position.

In some examples, the controller 104 adjusts dimming of the first panel 204 during the lighting event 400, thereby providing a second visual state of the first panel 204, different relative to the first visual state of the first panel 204, in which the first panel 204 is associated with a second visual characteristic that is different relative to the first visual characteristic associated with the first panel 204. In particular, when the first panel 204 is in the second visual state, the first panel 204 absorbs, reflects, scatters, and/or otherwise blocks less of the external light 406, 408 compared to when the first panel 204 is in the first visual state. In some examples, a transparency associated with the first panel 204 increases when the first panel 204 changes from the first visual state to the second visual state. Conversely, in such examples, the transparency associated with the first panel 204 decreases when the first panel 204 changes from the second visual state back to the first visual state.

Additionally, in some examples, the controller 104 adjusts dimming of the second panel 206 during the lighting event 400, thereby providing a second visual state of the second panel 206, different relative to the first visual state of the second panel 206, in which the second panel 206 is associated with a second visual characteristic that is different relative to the first visual characteristic associated with the second panel 206. In particular, when the second panel 206 is in the second visual state, the second panel 206 absorbs, reflects, scatters, and/or otherwise blocks less of the external light 406, 408 compared to when the second panel 206 is in the first visual state. In some examples, a transparency associated with the second panel 206 increases when the second panel 206 changes from the first visual state to the second visual state. Conversely, in such examples, the transparency associated with the second panel 206 decreases when the second panel 206 changes from the second visual state back to the first visual state.

As shown in FIG. 4B, the first panel 204 and the second panel 206 at least partially overlap with each other (e.g., the first panel 204 is positioned over or under the second panel 206). That is, the first panel 204 includes a first example area 412 that overlaps with a second example area 414 of the second panel 206. The first area 412 and the second area 414 of FIG. 4B are sometimes referred to as overlapping areas. Further, the first panel 204 includes a third area 416 that does not overlap with a fourth area 418 of the second panel 206. The third area 416 and the fourth area 418 of FIG. 4B are sometimes referred to as nonoverlapping areas. In such examples, the overlapping areas 412, 414 may absorb, reflect, scatter, and/or otherwise block more of the external light 406, 408 compared to the nonoverlapping areas 416, 418. In some such examples, the controller 104 is structured and/or configured to adjust dimming of the overlapping areas 412, 414 during the lighting event 400 but not the nonoverlapping areas 416, 418, which better maintains the light brightness experienced by the vehicle occupant 402 and/or the light intensity associated with the light portion 408 and/or the cabin space 410 during or after transition(s) of the sunroof 102. That is, in such examples, the controller 104 changes a visual state of the overlapping areas 412, 414 but leaves or does not change a visual state of the nonoverlapping areas 416, 418. Accordingly, in such examples, the controller 104 identifies and/or determines the overlapping areas 412, 414, for example, based on a position of at least one of the motor(s) 108, a position of the first panel 204, and/or user selection(s) corresponding to a desired position of the first panel 204 and/or a desired state of the sunroof 102.

Thus, in some examples, when the first panel 204 is in the second visual state, the first area 412 is visually different relative to the third area 416. Alternatively, in some examples, when the first panel 204 is in the second visual state, the first area 412 and the third area 416 are visually similar or the same. Further, in some examples, when the second panel 206 is in the second visual state, the second area 414 is visually different relative to the fourth area 418. Alternatively, in some examples, when the second panel 206 is in the second visual state, the second area 414 and the fourth area 418 are visually similar or the same.

When the first panel 204 is in the second position, the motor(s) 108 may be associated with a particular motor position. As such, in some examples, the position of the motor(s) 108 corresponds and/or correlates to the second position of the first panel 204. In particular, in such examples, the controller 104 advantageously uses positional data associated with the motor(s) 108 to determine and/or predict such overlapping areas 412, 414 of the first and second panels 204, 206.

In some examples, to facilitate adjusting dimming of sunroof panels 204, 206, the controller 104 detects a second intensity associated with the light portion 408 and/or the cabin space 410, for example, via the sensor(s) 106. In particular, in such examples, the controller 104 detects the second light intensity when the first panel 204 at least partially overlaps with the second panel 206 and/or the sunroof 102 is in the open state, which enables the controller 104 to determine the dimming adjustment(s) for the panel(s) 204, 206 in some examples. That is, the controller 104 can detect the second light intensity when the first panel 204 is moving (e.g., from the first positon to the second position) and/or when the first panel 204 is stopped (e.g., in the second position). When such dimming adjustments are carried out by the controller 104, the first and second panels 204,206 cause the second light intensity associated with the light portion 408 to be substantially similar and/or the same relative to the first light intensity associated with the light portion 408. For example, the controller 104 may repeatedly and/or continuously adjust dimming of the first panel 204 and/or the second panel 206 based on the first and second light intensities until the controller 104 determines that the second light intensity substantially matches the first light intensity.

Figure 5:
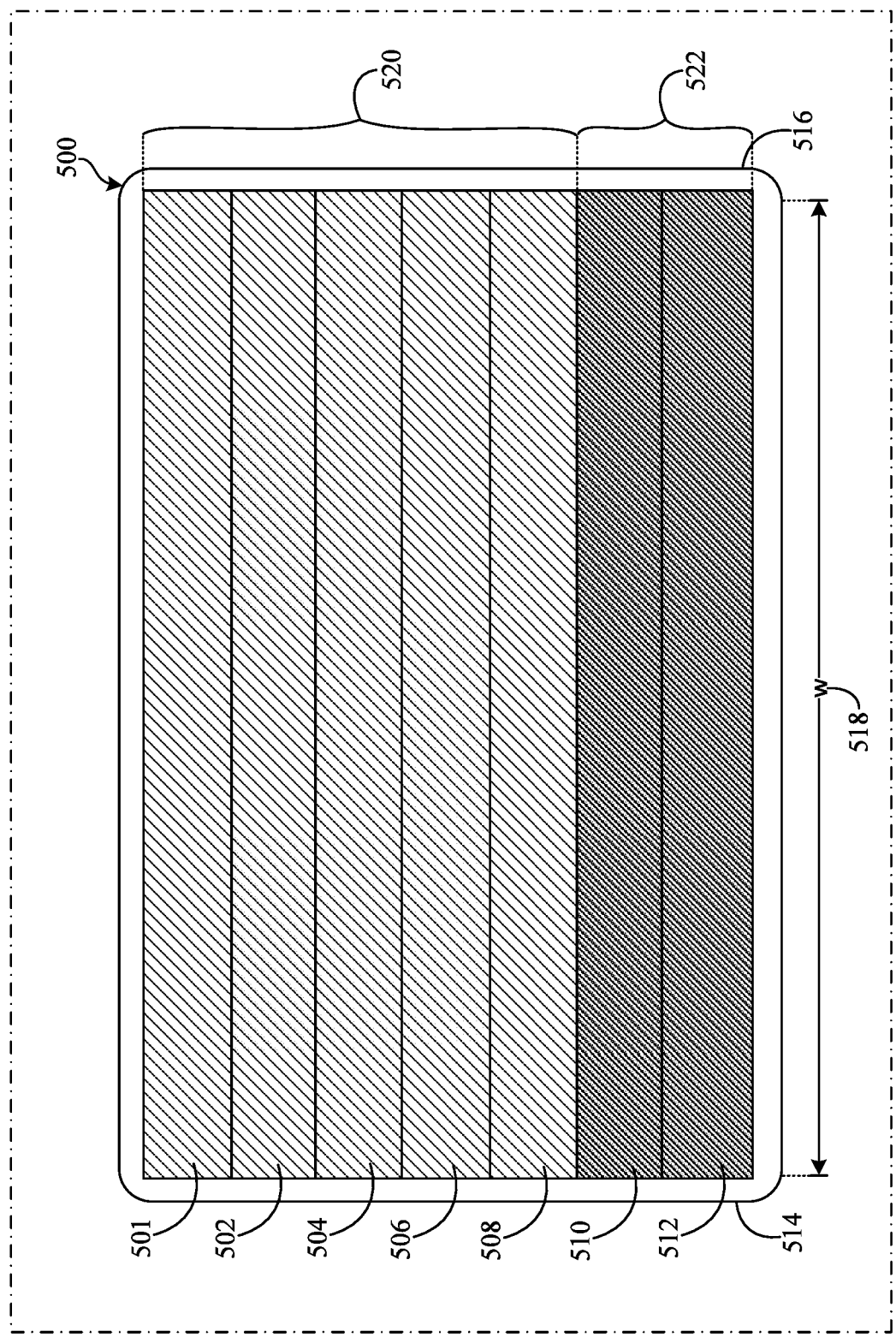
FIG. 5 is a view of an example dimmable sunroof panel in accordance with the teachings of this disclosure.

FIG. 5 is a view of a third example dimmable sunroof panel 500 in accordance with the teachings of this disclosure. In some examples, the third panel 500 of FIG. 5 corresponds to and/or is otherwise used to implement the first panel 204 and/or the second panel 206. As such, in some examples, the controller 104 controls dimming functionality associated with the third panel 500.

According to the illustrated example of FIG. 5, the third panel 500 includes example dimming bands 501, 502, 504, 506, 508, 510, 512 positioned thereon, seven of which are shown in this example. In particular, each of the dimming bands 501, 502, 504, 506, 508, 510, 512 has a visual characteristic (e.g., one or more of a transparency, a tint, a color, etc.) associated therewith that changes, for example, based on voltage. For example, as a voltage applied to a particular band 501, 502, 504, 506, 508, 510, 512 increases, a transparency of that band 501, 502, 504, 506, 508, 510, 512 increases. Conversely, as the voltage applied to the band 501, 502, 504, 506, 508, 510, 512 decreases, the transparency of the band 501, 502, 504, 506, 508, 510, 512 decreases. Although FIG. 5 depicts the third dimmable sunroof panel 500 having the seven dimming bands 501, 502, 504, 506, 508, 510, 512, in some examples, the third sunroof panel 500 includes additional, fewer, and/or different dimming bands.

As shown in FIG. 5, each of the dimming bands 501, 502, 504, 506, 508, 510, 512 extends from a first side 514 of the third panel 500 to a second side 516 of the third panel 500 opposite the first side 514. For example, each of the dimming bands 501, 502, 504, 506, 508, 510, 512 extends across an example width 518 of the third panel 500. In some such examples, each of the dimming bands 501, 502, 504, 506, 508, 510, 512 is rectangular. Although FIG. 5 depicts the third sunroof panel 500 having the rectangular dimming bands 501, 502, 504, 506, 508, 510, 512 that extend across the width 518 of the third sunroof panel 500, in some examples, the third sunroof panel 500 is implemented differently while maintaining similar dimming functionality. For example, one or more (e.g., all) of the bands 501, 502, 504, 506, 508, 510, 512 may be shaped differently. Further, in some examples, instead of the dimming bands 501, 502, 504, 506, 508, 510, 512, the third sunroof panel 500 may define a grid of relatively small areas that are square, rectangular, circular, etc., each of which is dimmable.

According to the illustrated example of FIG. 5, the third panel 500 includes a fifth area 520 and a sixth area 522 that are associated with different visual characteristics relative to each other. For example, the fifth area 520 is more transparent and/or clearer relative to the sixth area 522. As a result, the fifth area 520 absorbs, reflects, scatters, and/or blocks less light relative to the sixth area 522. In some examples, the fifth area 520 of FIG. 5 corresponds to the first area 412 of the first panel 204 and/or the second area 414 of the second panel 206. Further, in some examples, the fourth area 522 of FIG. 5 corresponds to third area 416 of the first panel 204 and/or the fourth area 418 of the second panel 206.

As shown in FIG. 5, the first band 501, the second band 502, the third band 504, the fourth band 506, and the fifth band 508 form, define, and/or otherwise correspond to the fifth area 520. As such, the first, second, third, fourth, and fifth bands 501, 502, 504, 506, 508 are sometimes referred to as overlapping dimming bands and/or overlapping bands. Further, as shown in FIG. 5, the sixth band 510 and the seventh band 512 form, define, and/or otherwise correspond to the sixth area 522. As such, the sixth and seventh bands 510, 512 are sometimes referred to as nonoverlapping dimming bands and/or nonoverlapping bands. However, in some examples, the fifth and sixth areas 520, 522 are formed by, defined by, and/or otherwise correspond to different ones of the bands 502, 502, 504, 506, 508, 510, 512.

Although FIG. 5 depicts the third panel 500 having the fifth area 520 that is visually different relative to the sixth area 522, in some examples, the controller 104 controls the third panel 500 differently. For example, the fifth area 520 may be visually similar or the same relative to the sixth area 522. That is, in such examples, the fifth area 520 has a visual characteristic that is substantially similar or the same relative to a visual characteristic of the sixth area 522.

Further, although FIG. 5 depicts aspects in connection with the third panel 500, in some examples, such aspects likewise apply to one or more other sunroof panels (e.g., the first panel 204 and/or the second panel 206). For example, each of the first panel 204 and the second panel 206 includes one or more dimming bands such as, for example, the first dimming band 501, the second dimming band 502, the third dimming band 504, the fourth dimming band 506, the fifth dimming band 508, the sixth dimming band 510, and the seventh dimming band 512. In other words, in such examples, the first panel 204 includes first dimming bands (e.g., two or more dimming bands) positioned thereon, and the second panel 206 includes second dimming bands (e.g., two or more dimming bands) positioned thereon. Accordingly, in some examples, the controller 104 controls one or more of the first dimming bands to change the visual characteristic associated with the first panel 204 and/or the visual state of the first panel 204. Further, in some examples, the controller 104 also controls one or more of the second dimming bands to change the visual characteristic associated with the second panel 206 and/or the visual state of the second panel 206.

Figure 6:
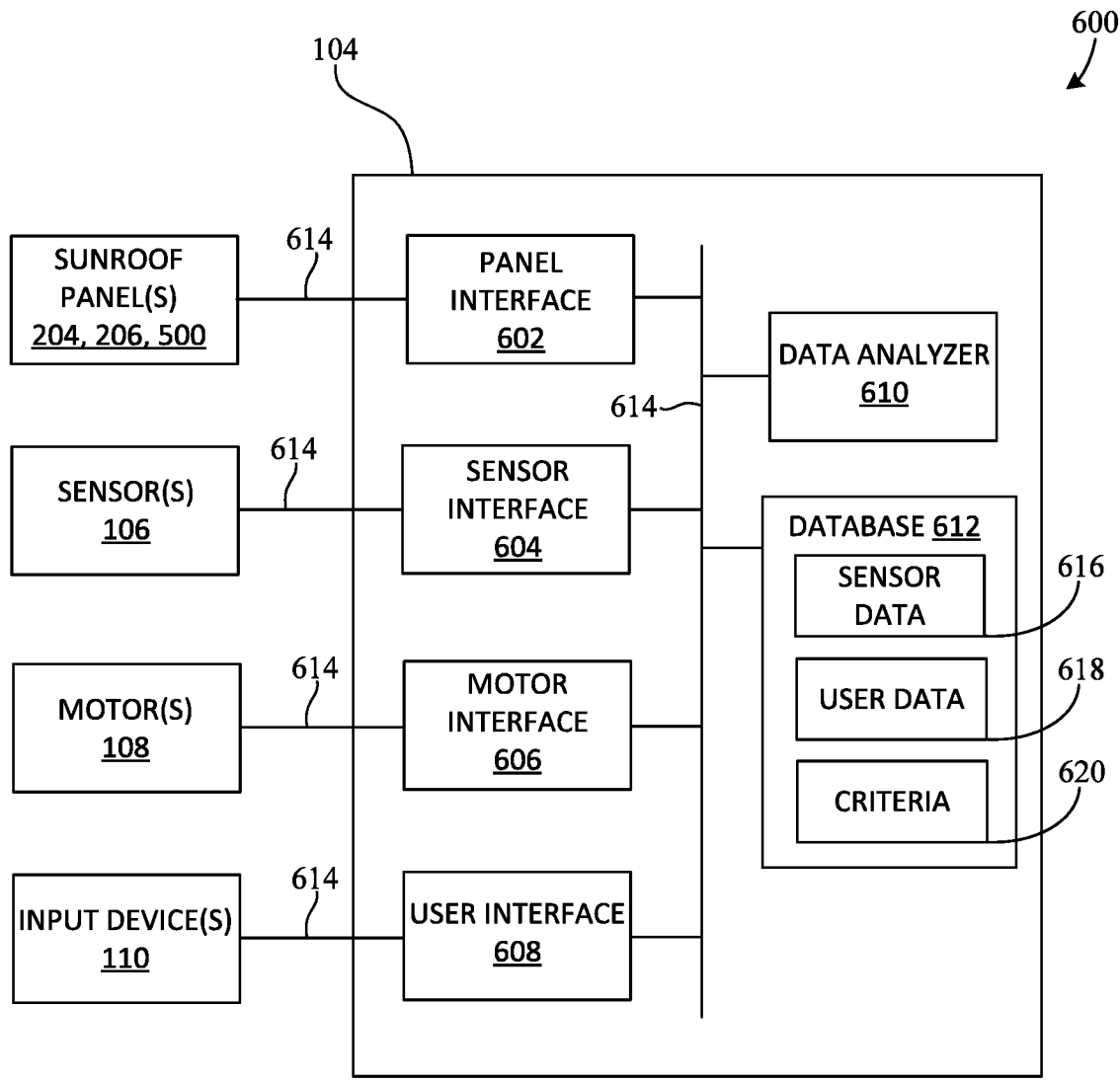
FIG. 6 is a block diagram of an example sunroof dimming system in accordance with the teachings of this disclosure.

FIG. 6 is a block diagram of an example sunroof dimming system 600 in accordance with the teachings of this disclosure. In some examples, the sunroof dimming system 600 is implemented by the controller 104 and/or the vehicle 100. According to the illustrated example of FIG. 6, the sunroof dimming system 600 includes an example panel interface 602, an example sensor interface 604, an example motor interface 606, an example user interface 608, an example data analyzer 610, and an example database 612. The sunroof dimming system 600 of FIG. 6 is communicatively coupled to one or more of the sunroof panel(s) 204, 206, 500, the sensor(s) 106, the motor(s) 108, and the input device(s) 110 via one or more example communication links 614 such as, for example, one or more signal or transmission wires, a bus (e.g., a CAN), radio frequency, etc.

The panel interface 602 of FIG. 6 enables and/or facilitates controlling dimming functionality associated with one or more of the first panel 204, the second panel 206, and/or the third panel 500. In some examples, the panel interface 602 is commutatively coupled, via the link(s) 614, to the panel(s) 204, 206, 500 to transmit, apply, and/or otherwise provide (e.g., repeatedly and/or continuously) electrical power and/or one or more control signals or commands to the panel(s) 204, 206, 500, thereby controlling dimming of the panel(s) 204, 206, 500. Additionally or alternatively, in some examples, the panel interface 602 is communicatively coupled, via the link(s) 614, to one or more (e.g., all) of the dimming bands 501, 502, 504, 506, 508, 510, 512 associated with the panel(s) 204, 206, 500 to similar control dimming of the panel(s) 204, 206, 500.

In some examples, the panel interface 602 transmits, applies, and/or otherwise provides a first voltage (e.g., repeatedly and/or continuously) to at least a portion of the first panel 204, thereby controlling the visual characteristic associated with the first panel 204 and/or otherwise controlling the visual state of the first panel 204. Further, in some such examples, the panel interface 602 similarly provides such voltage to one or more of the first dimming bands of the first panel 204, thereby controlling the visual characteristic(s) associated with respective ones of the first dimming band(s).

Additionally or alternatively, in some examples, the panel interface 602 transmits, applies, and/or otherwise provides (e.g., repeatedly and/or continuously) a second voltage to the second panel 206, thereby controlling the visual characteristic associated with the second panel 206 and/or otherwise controlling the visual state of the second panel 206. Further, in some such examples, the panel interface 602 similarly provides such voltage to one or more of the second dimming bands of the second panel 206, thereby controlling the visual characteristic(s) associated with respective ones of the second dimming bands. The first voltage is sometimes referred to as a first electrical parameter, and the second voltage is sometimes referred to as a second electrical parameter.

In some examples, the panel interface 602 carries out or executes one or more dimming adjustments provided to the sensor interface 604 from the data analyzer 610. For example, the sensor interface 604 adjusts (e.g., increases, decreases, and/or limits) the first voltage applied to one or more portions of the first panel 204 based on the dimming adjustment(s), thereby adjusting dimming associated with the first panel 204. That is, in some examples, when the panel interface 602 carries out the dimming adjustment(s), the visual characteristic and/or the visual state of the first panel 204 changes. Similarly, in another example, the sensor interface 604 adjusts (e.g., increases, decreases, and/or limits) the second voltage applied to one or more portions of the second panel 206 based on the dimming adjustment(s), thereby adjusting dimming associated with the second panel 206. That is, in some examples, when the panel interface 602 carries out the dimming adjustment(s), the visual characteristic and/or the visual state of the second panel 206 changes.

The sensor interface 604 of FIG. 6 facilitates interactions and/or communications between the sunroof dimming system 600 and the sensor(s) 106. In some examples, the sensor interface 604 is communicatively coupled, via the link(s) 614, to the sensor(s) 106 to receive (e.g., repeatedly and/or continuously) example sensor data 616 therefrom. That is, in some examples, the sensor(s) 106 generate at least a portion of the sensor data 616 in the database 612. In some examples, at least a portion of the sensor data 616 is indicative of a brightness associated with the external light 406, 408.

The motor interface 606 of FIG. 6 facilitates opening and/or closing the sunroof 102 and/or otherwise changing the state of the sunroof 102 via the motor(s) 108. In some examples, the motor interface 606 is communicatively coupled, via the link(s) 614, to the motor(s) 108 to control movement of the first panel 204, for example, between the first and second positions of the first panel 204. In some examples, the motor interface 606 adjusts (e.g., reduces, increases, and/or limits) electrical power provided to the motor(s) 108, thereby changing output of the motor(s) 108 and, thus, changing a position of the first panel 204. In some examples, the motor interface 606 detects a position of the motor(s) 108, which may correspond to a position of the first panel 204, as previously mentioned. In such examples, the motor interface 606 transmits such motor position(s) and/or related positional data to the data analyzer 610, which facilitates determining overlapping areas and/or overlapping dimming bands of the first and second panels 204, 206.

The user interface 608 of FIG. 6 facilitates interactions and/or communications between one or more end users (e.g., the vehicle occupant 402) and the sunroof dimming system 600. In some examples, the user interface 608 of FIG. 6 is communicatively coupled, via the link(s) 614, to the input device(s) 110 to receive example user data 618 therefrom. In some examples, at least a portion of the user data 618 is indicative of user selection(s) corresponding to one or more of a position of the first panel 204, a visual state of the first panel 204, a visual state of the second panel 208, and/or a state of the sunroof 102. For example, in response to the vehicle occupant 402 interacting with the input device(s) 110 and/or providing input(s) or selection(s) thereto, the input device(s) 110 provide the selection(s) or related user data 618 to the user interface 608.

The database 612 of FIG. 6 stores (e.g., temporarily and/or permanently) and/or provides access to at least a portion of the data 616, 618, 620. In some examples, the database 612 is communicatively coupled, via the link(s) 614, to one or more of the panel interface 602, the sensor interface 604, the motor interface 606, the user interface 608, and/or the data analyzer 610. For example, one or more of the panel interface 602, the sensor interface 604, the motor interface 606, the user interface 608, and/or the data analyzer 610 transmit and/or otherwise provide (e.g., repeatedly and/or continuously) data to the database 612. Conversely, in some examples, the database 612 transmits and/or otherwise provides (e.g., repeatedly or continuously) data to the panel interface 602, the sensor interface 604, the motor interface 606, the user interface 608, and/or the data analyzer 610.

To determine how to control the first panel 204, the second panel 206, and/or the motor(s) 108, the data analyzer 610 particular processes at least a portion of the data 616, 618, 620 (e.g., stored in the database 612), as discussed further below in connection with FIGS. 7 and 8. In some examples, the data analyzer 610 detects one or more conditions associated with the vehicle 100 based on the data 616, 618, 620 such as, for example, the lighting event 400. In some examples, the data analyzer 610 detects, via the sensor(s) 106 and/or a portion of the sensor data 616, the one or more light intensities associated with the light portion 408 and/or the space 410 of the vehicle cabin 112, for example, when the first panel 204 is in the first position, the second position, and/or another position of the first panel 204 that is between the first and second positions. In some examples, the data analyzer 610 detects, via the input device(s) 110 and/or a portion of the user data 618, user selection(s) corresponding to one or more predetermined visual characteristics (e.g., particular transparencies, particular tints or colors, etc.) associated with the first panel 204 and one or more predetermined visual characteristics (e.g., particular transparencies, particular tints or colors, etc.) associated with the second panel 206. Further, in some examples, the data analyze 610 detects, via the input device(s) 110 and/or a portion of the user data 618, user selection(s) corresponding to a particular position of the first panel 204 and/or a particular state of the sunroof 102. In particular in such examples, the data analyzer 610 directs the panel interface 602 to control dimming of the first panel 204 and/or the second panel 206 based on the detected condition(s). Further, in such examples, the data analyzer 610 directs the motor interface 606 to control the motor(s) 108 based on the detected condition(s).

In some examples, the data analyzer 610 directs the panel interface 602 to control dimming of the first panel 204 and/or the second panel 206 based on a detected light intensity associated with the light portion 408 and/or the cabin space 410 such as, for example the first light intensity depicted in connection with FIG. 4A. In such examples, the data analyzer 610 compares (e.g., one or more times) the detected light intensity to a first example light intensity threshold (e.g., a predetermined value of light intensity associated with user comfort). If such a comparison indicates to the data analyzer 610 that the detected light intensity is above the first light intensity threshold (i.e., the comparison does not satisfy at least a portion of the criteria 620), the data analyzer 610 directs the panel interface 602 to reduce the transparency of the first panel 204 and/or the transparency of the second panel 206. Further, in some examples, the panel interface 602 continues to reduce the transparency of the first panel 204 and/or the transparency of the second panel 206 until the data analyzer 610 determines that the detected light intensity is at or below the first light intensity threshold (i.e., until the portion of the criteria 620 is satisfied). As such, in some examples, the criteria 620 include the first light intensity threshold and/or one or more other appropriate thresholds (e.g., a detected light intensity) to facilitate data comparison(s).

To determine one or more dimming adjustments for the sunroof panels 204, 206 and/or when to execute such dimming adjustment(s), the data analyzer 610 further processes at least a portion of the data 616, 618, 620 (e.g., stored in the database 612). In particular, the data analyzer 610 transmits and/or otherwise provides (e.g., repeatedly and/or continuously) the adjustment(s) to the panel interface 602 for execution. That is, the data analyzer 610 directs the panel interface 602 to adjust dimming of the first panel 204 and/or the second panel 206 based on the determined dimming adjustment(s).

In some examples, the data analyzer 610 determines one or more example dimming adjustment(s) associated with changing (e.g., increasing and/or decreasing) the transparency of the first panel 204. For example, the data analyzer 610 calculates a change (e.g., an increase and/or a decrease) for the first voltage applied to the first panel 204 by the panel interface 602 based on the criteria 620. In such examples, the criteria 620 includes any of one or one or more equations, one or more models, more empirical relations, one or more data maps, one or more plots, one or more tables, etc. that correlate a change in the first voltage and a change in light intensity transmitted by the first panel 204. When such adjustment(s) are carried out by the panel interface 602, the panel interface 602 changes (e.g., increases and/or decreases) the first voltage accordingly.

Similarly, in some examples, the data analyzer 610 determines one or more other example dimming adjustments associated with changing (e.g., increasing and/or decreasing) the transparency of the second panel 206. For example, the data analyzer 610 calculates a change (e.g., an increase and/or a decrease) for the second voltage applied to the second panel 206 by the panel interface 602 based on the criteria 620. In such examples, the criteria 620 includes any of one or more equations, one or more models, one or more empirical relations, one or more data maps, one or more plots, one or more tables, etc. that correlate a change in the second voltage and a change in light intensity transmitted by the second panel 206. When such adjustment(s) are carried out by the panel interface 602, the panel interface 602 changes (e.g., increases and/or decreases) second voltage accordingly.

In some examples, the data analyzer 610 calculates such voltage changes based on a detected light intensity associated with the light portion 408 and/or the cabin space 410 when the first panel 204 is in the second position (i.e., when the sunroof 102 is in the open state) such as, for example, the second light intensity depicted in connection with FIG. 4B. In such examples, the data analyzer 610 compares (e.g., one or more times) the detected light intensity to a second example light intensity threshold (e.g., first light intensity threshold or the first detected light intensity associated with the light portion 408 and/or the cabin space 410). If such a comparison indicates to the data analyzer 610 that the detected light intensity is below the second light intensity threshold (e.g., the comparison does not satisfy at least a portion of the criteria 620), the data analyzer 610 directs the panel interface 602 to increase the transparency of the first panel 204 and/or the transparency of the second panel 206. Further, in some examples, the panel interface 602 continues to increase the transparency of the first panel 204 and/or the transparency of the second panel 206 until the data analyzer 610 determines that the detected light intensity is at or above the second light intensity threshold (i.e., until the portion of the criteria 620 is satisfied).

In some examples, the data analyzer 610 determines an area of the first panel 204 that overlaps or is to overlap with the second panel 206 such as, for example, the first area 412 and the second area 414. In such examples, the data analyzer 610 determines such overlapping areas of the first and second panels 204, 206 based on at least a portion of the criteria 620. In such examples, at least a portion of the criteria 620 includes any of one or more equations, one or more models, one or more empirical relationships, one or more data maps, one or more tables, one or more plots, etc. that correlate positions of the motor(s) 108 and overlapping areas of the first and second panels 204, 206. In particular, the data analyzer 610 first determines a particular position (e.g., an observed position or a predicted position) of first panel 204, for example, based on a particular position of the motor(s) 108 and/or a user selected position of the first panel and/or a user selected state of the sunroof 102. Then, the data analyzer 610 determines an area (e.g., the first area 412) of the first panel 204 and an area (e.g., the second area 414) of the second panel 206 that overlap or will overlap when the first panel 204 reaches or is in the particular position. Additionally, in some such examples, the data analyzer 610 similarly determines overlapping dimming bands of the first dimming bands and the second dimming bands that correspond to the particular position of the first panel 204 such as, for example, the first band 501, the second band 502, the third band 504, the fourth band 506, and the fifth band 508. In such examples, the data analyzer 610 then directs the panel interface 602 to adjust a portion of the first and second voltages that is applied to the overlapping areas and/or the overlapping dimming bands.

As previously mentioned, the criteria 620 of FIG. 6 facilitate comparison(s) and/or determinations made by the data analyzer 610. In some examples, at least a portion of the criteria 620 is predetermined and/or preprogrammed into the database 612. For example, the criteria 620 includes any of one or more equations, one or more models, one or more empirical relationships, one or more data maps, one or more tables, one or more plots, etc. that correlate parameters of interest. For example, the criteria 620 correlate any of: (1) voltage applied to the panel(s) 204, 206, 500 and light transmitted by the respective panel(s) 204, 206, 500; (2) positions of the motor(s) 108 and overlapping areas (e.g., the overlapping areas 412, 414) and/or overlapping dimming bands (e.g., the first, second, third, fourth, and fifth bands 501, 502, 504, 506, 508) of the panel(s) 204, 206, 500; and/or (3) any other appropriate parameters that facilitate dimming control of the panel(s) 204, 206, 500. Additionally or alternatively, at least some of the criteria 620 is generated and/or otherwise provided during operation of the vehicle 100. For example, the criteria 620 may include one or more detected light intensities.

Although an example sunroof dimming system 600 is illustrated in FIG. 6, one or more of the elements, processes, and/or devices depicted in FIG. 6 may be combined, divided, re-arranged, omitted, eliminated, and/or implemented in any other way. Further, the example sunroof dimming system 600 of FIG. 6 may include one or more elements, processes, and/or devices in addition or alternatively to those illustrated in FIG. 6, and/or may include more than one of any or all of the illustrated elements, processes, and devices.

Additionally, one or more of the example controller 104, the example panel interface 602, the example sensor interface 604, the example motor interface 606, the example user interface 608, the example data analyzer 610, the example database 612, and/or, more generally, the example sunroof dimming system 600 of FIG. 6 may be implemented by hardware, software, firmware and/or any combination of thereof. For example, one or more (e.g., all) of the example controller 104, the example panel interface 602, the example sensor interface 604, the example motor interface 606, the example user interface 608, the example data analyzer 610, the example database 612, and/or, more generally, the example sunroof dimming system 600 could be implemented by one or more circuits (e.g., an analog or digital circuit, a logic circuit, a programmable processor, etc.). Further, in some examples, at least one of the example controller 104, the example panel interface 602, the example sensor interface 604, the example motor interface 606, the example user interface 608, the example data analyzer 610, the example database 612, and/or the example sunroof dimming system 600 include(s) a tangible machine-readable storage device or storage disk (e.g., a memory storing the software and/or firmware).

Figure 7:
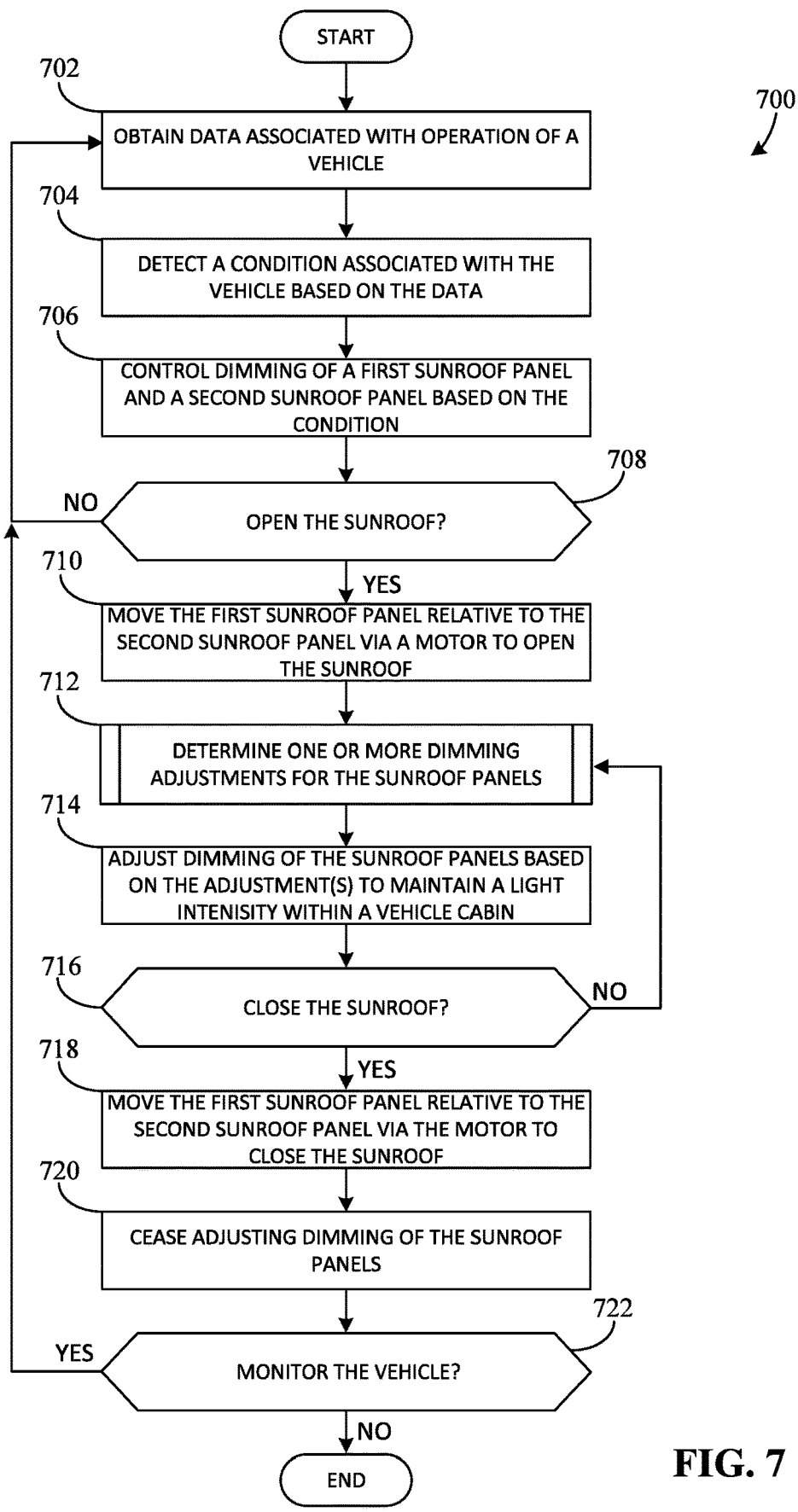
FIG. 7 is a flowchart representative of an example method that may be executed to implement the example sunroof dimming system of FIG. 6 to adjust dimming associated with dual sunroof panels.
Figure 8:
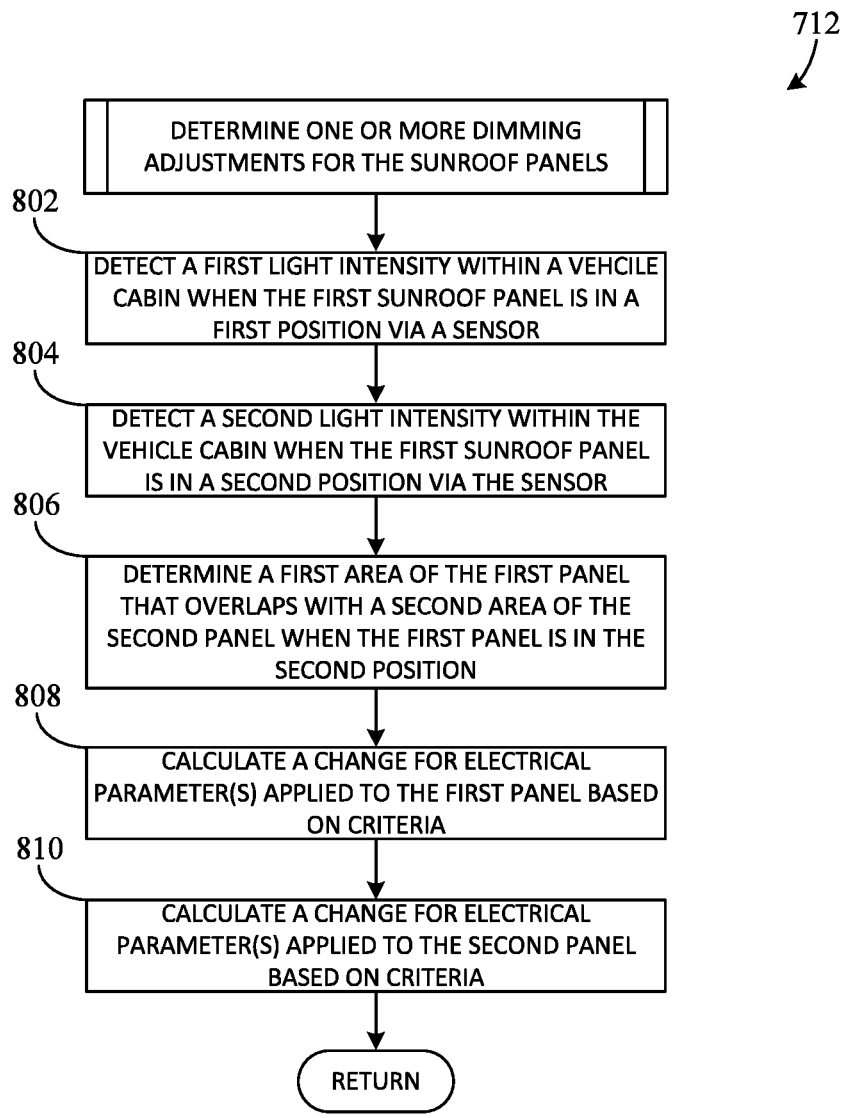
FIG. 8 is a flowchart representative of an example method that may be executed to implement the example sunroof dimming system of FIG. 6 to determine one or more dimming adjustments for sunroof panels.

Flowcharts representative of example hardware logic or machine-readable instructions for implementing the example sunroof dimming system 600 of FIG. 6 are shown in FIGS. 7 and 8. The machine-readable instructions may be a program or portion of a program for execution by a processor such as the processor 902 shown in the example processor platform 900, which is discussed in greater detail below in connection with FIG. 9. The program may be embodied in software stored on a tangible machine-readable storage medium such as a CD-ROM, a floppy disk, a hard drive, or a memory associated with the processor 902, but the entire program and/or parts thereof could be alternatively executed by a different device and/or embodied in firmware or dedicated hardware. Further, although the example program is described with reference to the flowcharts illustrated in FIGS. 7 and 8, many other methods of implementing the example sunroof dimming system 600 may alternatively be used. For example, the order of execution of the blocks may be changed, and/or some of the blocks described may be changed, eliminated, or combined. Additionally or alternatively, any or all of the block may be implemented by one or more hardware circuits (e.g., discrete and/or integrated analog and/or digital circuitry, logic circuit, a comparator, etc.)

The example processes of FIGS. 7 and 8 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and to exclude propagating signals and all transmission media. Additionally or alternatively, the example methods of FIGS. 7 and 8 may be implemented using coded instructions stored on a non-transitory machine-readable medium in which information is stored for any duration, which includes any type of computer or machine readable storage device or disk and excludes propagating signals and transmission media.

When used in connection with multiple elements, the term "and/or" refers to any combination or subset of the elements. For example, the form. A, B, and/or C refers to any of: (1) A alone; (2) B alone, (3) C alone; (4) A and B; (5) A and C; (6) B and C, and (7) A, B, and C.

FIG. 7 is a flowchart representative of an example method 700 that can be executed to implement the sunroof dimming system 600 of FIG. 6 to adjust dimming associated with dual sunroof panels. The example method 700 of FIG. 7 can be implemented in any of the vehicle 100, the controller 104, and/or the sunroof dimming system 600.

The method 700 of FIG. 7 begins by obtaining; sensor data associated with operation of a vehicle (block 702). In some examples, the sunroof dimming system 600 of FIG. 6 obtains (e.g., via the sensor interface 604, the motor interface 606, and/or the user interface 608) at least a portion of the data 616, 618, 620, which is associated with operation of the vehicle 100.

The method 700 of FIG. 7 also includes detecting a condition associated with the vehicle based on the data (block 704). In some examples, the sunroof dimming system 600 of FIG. 6 detects (e.g., via the data analyzer 610) a condition associated with the vehicle 100 based on the sensor data 616 and/car the user data 618 obtained in connection with block 702. In some examples, the sunroof dimming system 600 detects, via the sensor(s) 106 and/or a portion of the sensor data 616, the first light intensity associated with the light portion 408 that exists within the space 410 of the vehicle cabin 112, for example, when the first panel 204 is in the first position and/or the sunroof 102 is in the closed state (e.g., see FIG. 2 and/or FIG. 4A). In such examples, the sunroof dimming system 600 updates criteria 620 to include the first light intensity and/or otherwise stores related data (e.g., in the database 612). Additionally or alternatively, in some examples, the sunroof dimming system 600 detects, via the input device(s) 110 and/or a portion of the user data 618, user selection(s) corresponding to one or more of a first predetermined visual characteristic associated with the first panel 204, a second predetermined visual characteristic associated with the second panel 206, a particular positon of the first panel 204, and/or a particular state of the sunroof 104. In some such example, the first predetermined visual characteristic and the second predetermined visual characteristic are substantially the same.

The method 700 of FIG. 7 also includes controlling dimming of a first sunroof panel and a second sunroof panel based on the condition (block 706). In some examples, the sunroof dimming system 600 of FIG. 6 controls dimming (e.g., via the panel interface 602) of the first panel 204 and the second panel 206 based on the condition detected connection with block 704. In such examples, the sunroof dimming system 600 controls at least a portion (e.g., one or more of the bands 501, 502, 504, 506, 508, 510, 512 associated with the first panel 204) of the first panel 204 to provide the aforementioned first visual state of the first panel 204. For example, the sunroof dimming system 600 adjusts (e.g., increases and/or decreases) the first voltage applied to the first panel 204 based on the detected condition, thereby changing the transparency associated with the first panel 204. Further, in such examples, the sunroof dimming system 600 also controls at least a portion (e.g., one or more of the bands 501, 502, 504, 506, 508, 510, 512 associated with the second panel 206) of the second panel 206 to provide the aforementioned first visual state of the second panel 206. For example, the sunroof dimming system 600 adjusts (e.g., increases and/or decreases) the second voltage applied to the second panel 206 based on the detected condition, thereby changing the transparency associated with the second panel 206. Additionally, in some such examples, the first visual characteristic associated with the first panel 204 is substantially the same or similar relative to first visual characteristic associated with the second panel 206, as previously mentioned. Thus, in some such examples, each of the first and second panels 204, 206 is in the respective first visual state and/or has the respective first visual characteristic associated therewith when the first panel 204 is in the first position.

In some examples, the sunroof dimming system 600 controls dimming of the first panel 204 and/or the second panel 206 in such a manner based on the first light intensity associated with the light portion 408 and/or cabin space 410 detected in connection with block 704. In such examples, if the sunroof dimming system 600 determines (e.g., via the data analyzer 610) that the first or detected light intensity is above the first light intensity threshold, the sunroof dimming system 600 causes the transparency of the first panel 204 and/or the transparency of the second panel 206 to decrease, for example, until the first light intensity is at or below the first threshold light intensity. Additionally or alternatively in some examples, the sunroof dimming system 600 controls dimming of the first panel 204 and/or the second panel 206 in accordance with the user selection(s) detected in connection with block 704.

The method 700 of FIG. 7 also includes determining whether to open the sunroof (block 708). In some examples, the sunroof dimming system 600 of FIG. 6 determines (e.g., via the data analyzer 610) whether to open the sunroof 102, for example, via the input device(s) 110 and/or a portion of the user data 618 corresponding to a selected position (e.g., the second position) of the first panel 204 and/or a selected state (e.g., the open state) of the sunroof 102. In some examples, if the sunroof dimming system 600 provides a positive determination (e.g., the vehicle occupant 402 made appropriate selection(s) via the input device(s) 110) (block 708: YES), control of the example method 700 proceeds to block 710. However, if the sunroof dimming system 600 provides a negative determination (e.g., the vehicle occupant 402 did not make a selection via the input device(s) 110) (block 708: NO), control of the example method 700 returns to block 702.

The method 700 of FIG. 7 also includes moving the first sunroof panel relative to the second sunroof panel via a motor to open the sunroof (block 710). In some examples, the sunroof dimming system 600 of FIG. 6 moves (e.g., via the motor interface 606) the first panel 204 relative to the second panel 206 via the motor(s) 108 to open a the sunroof 102. In such examples, the sunroof dimming system 600 controls the motor(s) 108 to move the first panel 204 from the first position (e.g., see FIG. 2 and/or FIG. 4A) to the second position (e.g., see FIG. 3 and/or FIG. 4B), which provides the opening 300 and/or the open state of the sunroof 102. As previously mentioned, in some examples, the first panel 204 at least partially overlaps with the second panel 206 when the first panel 204 is in the second position.

The method 700 of FIG. 7 also includes determining one or more dimming adjustments for the sunroof panels (block 712). In some examples, the sunroof dimming system 600 of FIG. 6 determines (e.g., via the data analyzer 610) one or more adjustments for the first panel 204 and the second panel 206 that are associated with adjusting dimming of the first and second panels 204, 206. In particular, the sunroof dimming system 600 calculates a change for the first voltage applied to the first panel 204 and/or a change for the second voltage applied to the second panel 206, as discussed further below in connection with FIG. 8.

In some examples, the sunroof dimming system 600 determines a first example adjustment associated with increasing the transparency of the first panel 204 and a second example adjustment associated with increasing the transparency of the second panel 206. In such examples, the first adjustment includes increasing the first voltage, and the second adjustment includes increasing the second voltage. In particular, the and second dimming adjustments are carried out by the sunroof dimming system 600 in response to the sunroof 102 changing from the closed state to the open state. Additionally, in some examples, the sunroof dimming system 600 determines a third example adjustment associated with decreasing the transparency of the first panel 204 and a fourth example adjustment associated with decreasing the transparency of the second panel 206. In such examples, the third adjustment includes decreasing the first voltage, and the fourth adjustment includes decreasing the second voltage. In particular, the third and fourth dimming adjustments are carried out by the sunroof dimming system 600 in response to the sunroof 102 changing from the open state to the closed state.

The method 700 of FIG. 7 also includes adjusting dimming of the sunroof panels based on the adjustment(s) to maintain a light intensity within a vehicle cabin (block 714). In some examples, the sunroof dimming system 600 of FIG. 6 adjusts (e.g., via the panel interface 602) dimming of the first panel 204 and/or the second panel 206 based on the adjustment(s) determined in connection with block 712 to maintain the light intensity associated with the light portion 408 and/or the space 410 of vehicle cabin 112. That is, as the first panel 204 moves from the first position to the second position, the sunroof dimming system 600 causes the light intensity associated with the light portion 408 and/or the space 410 to remain substantially the same, which may be desirable to the vehicle occupant 402. For example, the light intensity may not fluctuate or may slightly fluctuate (e.g., by about 10% or less) when the sunroof 102 changes from the closed state to the open state as a result of the sunroof dimming system 600 adjusting dimming. As a result, the sunroof dimming system 600 maintains the light brightness associated with the light portion 408 that is experienced by the vehicle occupant 402 as the sunroof 102 changes from the closed state to the open state, which improves comfort of the vehicle occupant 402 and/or prevents excessive dimming of the cabin space 410 during or after such a transition of the sunroof 102 from the closed state to the open state.

In some examples at block 714, the sunroof dimming system 600 adjusts dimming of at least a portion (e.g., one or more of the dimming bands 501, 502, 504, 506, 508, 510,

512 associated with the first panel 204) of the first panel 204 based on the first adjustment to provide the aforementioned second visual state of the first panel 204 in response to the sunroof 102 changing from the closed state to the open state. Further, in some examples, the sunroof dimming system 600 adjusts dimming of at least a portion (e.g., one or more of the dimming bands 501, 502, 504, 506, 508, 510, 512 associated with the second panel 206) of the second panel 206 based on the second adjustment to provide the aforementioned second visual state of the second panel 206 in response to the sunroof 102 changing from the closed state to the open state. Additionally, in some such examples, the second visual characteristic associated with the first panel 204 is substantially the same or similar relative to the second visual characteristic associated with the second panel 206. Thus, in some examples, the sunroof dimming, system 600 increases the transparency associated with the first panel 204 and/or the transparency associated with the second panel 206 in response to the sunroof 102 changing from the closed state to the open state. Further, in some such examples, each of the first and second panels 204, 206 is in the respective second visual state and/or has the respective second visual characteristic associated therewith when the first panel 204 is in the second position.

In some examples at block 714, the sunroof dimming system 600 adjusts dimming of the first panel 204 and/or the second panel 206 based on a detected light intensity associated with the light portion 408 and/or cabin space 410 such as, for example, the first light intensity and/or the second light intensity. In such examples, sunroof dimming system 600 adjusts the first voltage applied to the first panel 204 and the second voltage applied to the second panel 206 based on the detected light intensity to maintain the detected light intensity.

In some examples at block 714, the sunroof dimming system 600 adjusts dimming of the overlapping areas 412, 414, 520 but does not adjust dimming of the nonoverlapping areas 416, 418, 522. For example, the sunroof dimming system 600 adjusts a portion of the first and second voltages that is applied to the overlapping areas 412, 414, 500 but does not adjust a portion of the first and second voltages that is applied to the nonoverlapping areas 416, 418, 522. Additionally, in examples where each of the first and second panels 204, 206 includes the aforementioned dimming bands, the sunroof dimming system 600 adjusts dimming of respective one(s) of the first and second dimming, bands that form, define, and/or otherwise correspond to the overlapping areas 412, 414 but does not adjust dimming of respective one(s) of the dimming bands that form, define, and/or otherwise correspond to the nonoverlapping areas 416 418 (e.g., see FIG. 5). For example, the sunroof dimming system 600 adjusts a portion of the first and second voltages that is applied to respective ones of the overlapping dimming bands of the first and second panels (e.g., the first band 501, the second band 502, the third band 504, the fourth band 506, and the fifth band 508) but does not adjust a portion of the first and second voltages that is applied to the nonoverlapping dimming bands of the first and second panels 204, 206 (e.g., the sixth band 510 and the seventh band 512).

The method 700 of FIG. 7 also includes determining whether to close the sunroof (block 716). In some examples, the sunroof dimming system 600 of FIG. 6 determines (e.g., via the data analyzer 610) whether to close the sunroof 102, for example, via the input device(s) 110 and/or a portion of the user data 618 corresponding to a selected position (e.g., the first position) of the first panel 204 and/or a selected state (e.g., the closed state) of the sunroof 102. In some examples, if the sunroof dimming system 600 provides a positive determination (e.g., the vehicle occupant 402 made appropriate selection(s) via the input device(s) 110) (block 716: YES), control of the example method 700 proceeds to block 718. However, if the sunroof dimming system 600 provides a negative determination (e.g., the vehicle occupant 402 did not make a selection via the input device(s) 110) (block 716: NO), control of the example method 700 returns to block 710.

Additionally, in some examples, the sunroof dimming system 600 repeatedly and/or continuously performs the operations of blocks 712 and 714, for example, until the vehicle occupant 402 makes appropriate selection(s) via the input device(s) 110. In this manner, the sunroof dimming system 600 accounts for the vehicle occupant 402 making adjustments (e.g., relative small positional changes) for the first panel 204 while the sunroof 102 remains in the open state.

The method 700 of FIG. 7 also includes moving the first sunroof panel relative to the second sunroof panel via the motor to close the sunroof (block 718). In some examples, the sunroof dimming system 600 of FIG. 6 moves (e.g., via the motor interface 606) the first panel 204 relative to the second panel 206 via the motor(s) 108 to close of the sunroof 102. In such examples, the sunroof dimming system 600 controls the motor(s) 108 to move the first panel 204 from the second position (e.g., see FIG. 3 and/or FIG. 4B) to the first position (e.g., see FIG. 2 and/or FIG. 4A). In some examples, as previously mentioned, the first panel 204 does not overlap with the second panel 206 when the first panel 204 is in the first position.

The method 700 of FIG. 7 also includes ceasing adjusting dimming of the sunroof panels (block 720). In some examples, the sunroof dimming system 600 of FIG. 6 ceases adjusting dimming (e.g., via the panel interface 602) of the first panel 204 and/or the second panel 206. That is, in some examples, the sunroof dimming system 600 controls at least a portion (e.g., one or more of the dimming bands 501, 502, 504, 506, 508, 510, 512 associated with the first panel 204) of the first panel 204 based on the third adjustment to provide the first visual state of the first panel 204 (or a different visual state of the first panel 204). For example, the sunroof dimming system 600 decreases the first voltage applied to the first panel 204. Further, in some examples, the sunroof dimming system 600 controls at least a portion (e.g., one or more of the dimming bands 501, 502, 504, 506, 508, 510, 512 associated with the second panel 206) of the second panel 206 based on the fourth adjustment to provide the aforementioned second visual state of the second panel 206 (or a different visual state of the second panel 206). For example, the sunroof dimming system 600 decreases the second voltage applied to the second panel 206. Thus, in some examples, the sunroof dimming system 600 decreases the transparency associated with the first panel 204 and/or the transparency associated with the second panel 206 in response to the sunroof 102 changing from the open state to the closed state.

In some examples at block 720, the sunroof dimming system 600 ceases adjusting dimming of the overlapping areas 412, 414, 520. Additionally, in examples where each of the first and second panels 204, 206 includes the aforementioned dimming bands, the sunroof dimming system 600 ceases adjusting dimming of respective one(s) of the first and second dimming bands that form, define, and/or otherwise correspond to the overlapping areas 412, 414. For example, the sunroof dimming system 600 ceases adjusting the portion of the first and second voltages that is applied to the overlapping dimming bands (e.g., first band 501, the second band 502, the third band 504, the fourth band 506, and the fifth band 508).

In this manner, the sunroof dimming system 600 further maintains the light intensity within the vehicle cabin 112. That is, as the first panel 204 moves from the second position to the first position (i.e. the sunroof 102 changes from the open state to the closed state), the sunroof dimming system 600 causes the light intensity associated with the light portion 408 and/or the space 410 to remain substantially the same, which may be desirable to the vehicle occupant 402. For example, the light intensity may not fluctuate or may slightly fluctuate (e.g., by about 10% or less) when the sunroof 102 changes from the open state to the closed state as a result of the sunroof dimming system 600 ceasing adjusting dimming of the first panel 204 and/or the second panel 206. As a result, the sunroof dimming system 600 further maintains the light brightness associated with the light portion 408 and/or the cabin space 410 that is experienced by the vehicle occupant 402 when the sunroof 102 changes from the open state to the closed state, which improves comfort of the vehicle occupant 402 and/or prevents the cabin space 410 from becoming relatively bright and/or hot during or after such a transition of the sunroof 102 from the open state to the closed state.

The method 700 of FIG. 7 also includes determining whether to monitor the vehicle (block 722). In some examples, the sunroof dimming system 600 of FIG. 6 determines (e.g., via the data analyzer 610) whether to monitor the vehicle 100, for example, based on at least a portion of the data 616, 618, 620. In some examples, if the sunroof dimming system 600 provides a positive determination (e.g., the vehicle 100 is in operation) (block 722: YES), control of the example method 700 returns to block 702. However, if the sunroof dimming system 600 provides a negative determination (e.g., the vehicle 100 is not in operation) (block 722: NO), the process ends.

Although the example method 700 is described in connection with the flowchart of FIG. 7, other methods of implementing the example sunroof dimming system 600 may alternatively be used, as previously mentioned. For example, the order of execution of the blocks 702, 704, 706, 708, 710, 712, 714, 716, 718, 720, 722 may be changed, and/or some of the blocks 702, 704, 706, 708, 710, 712, 714, 716, 718, 720, 722 described may be changed, eliminated, or combined.

FIG. 8 is a flowchart of an example method 712 that may be executed to implement the example sunroof dimming system 600. The example method 712 of FIG. 8 can be implemented in any of the example vehicle 100, the example controller 104, and/or the sunroof dimming system 600. Example operations of blocks 802, 804, 806, 808, 810 may be used to implement block 712 of FIG. 7. In particular, the example method 712 of FIG. 8 is effective in determining one or more adjustments for sunroof panels associated with adjusting dimming of the sunroof panels.

The method 712 of FIG. 8 begins by detecting a first light intensity within a vehicle cabin when the first sunroof panel is in a first positon via a sensor (block 802). In some examples, the sunroof dimming system 600 of FIG. 6 detects (e.g., via the data analyzer 610) the aforementioned first light intensity associated with the light portion 408 and/or the cabin space 410 when the first panel 204 is in the first position positon (i.e., when the sunroof 102 is in the closed state) via the sensor(s) 106. In some such examples, the sunroof dimming system 600 updates the criteria 620 to include the first light intensity detected in connection with block 802 and/or otherwise stores related data (e.g., in the database 612).

The method 712 of FIG. 8 also includes detecting a second light intensity within the vehicle cabin 112 when the first sunroof panel is in a second position via the sensor (block 804). In some examples, the sunroof dimming system 600 of FIG. 6 detects (e.g., via the data analyzer 610) the second light intensity associated with the light portion 408 and/or the space 410 when the first panel 204 is in the second position (i.e., when the sunroof 102 is in the open state) via the sensor(s) 106. In some such examples, the sunroof dimming system 600 updates the criteria 620 to include second light intensity detected in connection with block 804 and/or otherwise stores related data (e.g., in the database 612).

The method 712 of FIG. 8 also includes determining a first area of the first panel that overlaps with a second area of the second panel when the first panel is in the second position (block 806). In some examples, the sunroof dimming system 600 of FIG. 6 determines (e.g., via the data analyzer 610) that the first area 412 of the first panel 204 overlaps or will overlap with the second area 414 of the second panel 206 when the first panel 204 is in the second position (e.g., see FIG. 4B). In some examples, the sunroof dimming system 600 updates the criteria 620 to include the first area 412 and the second area 414 determined in connection with block 806 and/or otherwise stores related data (e.g., in the database 612).

Additionally, in examples where each of the first and second panels 204, 206 includes the dimming bands, the sunroof dimming systems 600 determines which one(s) of the first and second dimming bands form, define, and/or otherwise correspond to the overlapping areas 412, 414 or will correspond to the overlapping areas 412, 414 when the first panel 204 is in the second position. That is, in such examples, the sunroof dimming system 600 determines the overlapping dimming bands of the first and second panels 204, 206 that correspond to the second position of the first panel 204. For example, the sunroof dimming system 600 determines that first band 501, the second band 502, the third band 504, the fourth band 506, and the fifth band 508 correspond to the second position of the first panel 204.

The method 712 of FIG. 8 also includes calculating a change for electrical parameter(s) applied to the first panel based on criteria (block 808). In some examples, the sunroof dimming system 600 of FIG. 6 calculates (e.g., via the data analyzer 610) a change (e.g., an increase or a decrease) for the first voltage applied to the first panel 204 based on at least a portion of the criteria 620, which provides the first adjustment and/or the third adjustment.

The method 712 of FIG. 8 also includes calculating a change for electrical parameter(s) applied to the second panel based on criteria (block 810). In some examples, the sunroof dimming system 600 of FIG. 6 calculates (e.g., via the data analyzer 610) a change (e.g., an increases and/or a decrease) for the second voltage applied to the second panel 206 based on at least a portion of the criteria 620, which provides the second adjustment and/or the fourth adjustment. In some examples, after performing the operation of the block 810, control of the method 712 of FIG. 8 returns to a calling function such as the method 700 of FIG. 7.

Although the example method 712 is described in connection with the flowchart of FIG. 8, other methods of implementing the example sunroof dimming system 600 may alternatively be used, as previously mentioned. For example, the order of execution of the blocks 802, 804, 806, 808, 810 may be changed, and/or some of the blocks 802, 804, 806, 808, 810 described may be changed, eliminated, or combined.

Figure 9:
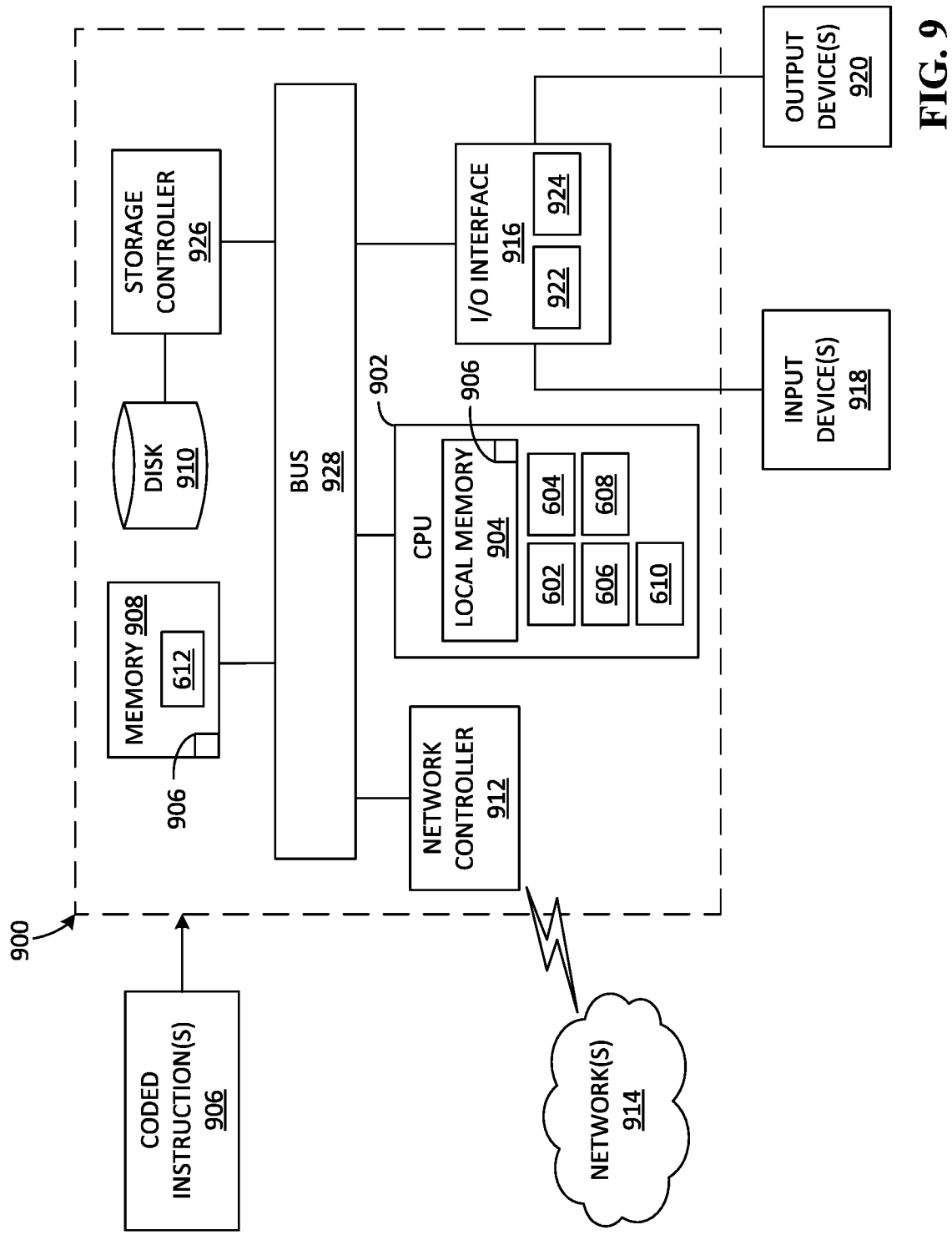
FIG. 9 is a block diagram of an example processor platform structured to execute instructions to carry out the example methods of FIGS. 7 and 8 and/or, more generally, to implement the example sunroof dimming system of FIG. 6.

FIG. 9 is a block diagram of an example processor platform 900 structured to execute instructions to carry out the method of FIGS. 7 and 8 and/or, more generally, to implement the sunroof dimming system 600 of FIG. 6. For example, the processor platform 900 can be a personal computer, a server, a mobile device (e.g., a cell phone, a smart phone, a tablet, etc.) or any other type of computing device. According to the illustrated example of FIG. 9, the processor platform 900 includes a central processing unit (CPU) 902 (sometimes referred to as a processor), which is hardware (e.g., one or more integrated circuits, logic circuits, microprocessors, etc.). The CPU 902 of FIG. 9 includes a local memory 904 such as, for example, a cache. According to the illustrated example of FIG. 9, the CPU 902 implements the example panel interface 602, the example sensor interface 604, the example motor interface 606, the example user interface 608, and the example data analyzer 610.

Coded instruction(s) 906 to implement the methods of FIGS. 7 and 8 may be stored in a main memory 908 of the processing platform 900. The memory 908 may include a volatile memory (e.g., random access memory device(s) such as Dynamic Random Access Memory (DRAM)) and a non-volatile memory (e.g., flash memory). Such processes and/or instructions may also be stored on a storage medium disk 910 associated with the processor platform 900, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing platform 900 communicates, such as a server or computer.

Further, the claimed advancements may be provided as a utility application, background daemon, or component of an operating system, or combination thereof, executing in conjunction with the CPU 902 and an operating system such as, for example, Microsoft Windows 7, Microsoft Windows 10, UNIX, Solaris, LINUX, Apple MAC-OS or any other system(s) known to those skilled in the art.

The hardware elements in order to achieve the processing platform 900 may be realized by various circuitry elements, known to those skilled in the art. For example, the CPU 902 may be a Xenon or Core processor from Intel of America or an Opteron processor from AMD of America, or may be other processor types that would be recognized by one of ordinary skill in the art. Alternatively, the CPU 902 may be implemented on an FPGA, ASIC, PLD or using discrete logic circuits, as one of ordinary skill in the art would recognize. Further, the CPU 902 may be implemented as multiple processors cooperatively working in parallel to perform the instructions of the inventive processes described above.

In some examples, the processor platform 900 of FIG. 9 also includes a network controller 912 such as, for example, an Intel Ethernet PRO network interface card from Intel Corporation of America for interfacing with one or more networks 914. As can be appreciated, the network(s) 914 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 914 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing platform 900 of FIG. 9 includes a general purpose I/O interface circuit 916 that interfaces and/or otherwise communicates with one or more input devices 918 and/or one or more output devices 920. The I/O interface circuit 916 of FIG. 9 may be implemented as an Ethernet interface, a universal serial bus (USB), a PCI express interface, and/or any other type of standard interface.

The input devices 918 are connected to the I/O interface 916 and may include, for example, a keyboard, a mouse, a touchscreen, a button, a microphone, a voice recognition system, a camera, and/or any other suitable device(s) for enabling a user to input data and/or commands to the CPU 902. As such, in some examples, the I/O interface circuit 916 includes a display controller 922 such as, for example, a NVIDIA GeForce GTX or Quadro graphics adaptor from NVIDIA Corporation of America for interfacing with a display (e.g., a Hewlett Packard HPL2445w LCD monitor).

The output device(s) 920 are also connected to the I/O interface circuit 916 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit includes a sound controller 924 such as, for example, Sound Blaster X-Fi Titanium from Creative, to interface with a speaker and/or a microphone.

The processor platform 900 of FIG. 9 also includes a general purpose storage controller 926 that connects the storage medium disk 910 with a communication bus 928. The storage controller 926 may also control access to the memory 908. The communication bus 928 of FIG. 9 may be an ISA, EISA, VESA, PCI, etc. for interconnecting all of the components of the processor platform 900. For example, the CPU 902 communicates with the main memory 908 via the bus 928.

It will be appreciated that the systems, apparatus, and methods disclosed in the foregoing description provide numerous advantages. Examples disclosed herein advantageously adjust dimming associated with two sunroof panels during certain driving conditions to maintain light intensity within a vehicle cabin when a sunroof opens and/or closes. Examples disclosed herein improve comfort of vehicle occupant(s), prevent excessive and/or undesired dimming of the vehicle cabin resulting from transition(s) of the sunroof, and/or prevent the vehicle cabin from becoming relatively bright and/or hot resulting from transition(s) of the sunroof.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A sunroof dimming system for a vehicle, comprising:
a first dimmable panel of a sunroof including first dimming bands;
a second dimmable panel of the sunroof including second dimming bands, the first dimmable panel moveable relative to the second dimmable panel to open or close the sunroof; and
a controller operatively coupled to the first dimmable panel and the second dimmable panel, the controller configured to
adjust dimming of the first dimmable panel and the second dimmable panel to maintain a light intensity of an external light of a vehicle cabin when the sunroof changes between a closed state and an open state,
determine a position of the first dimmable panel,
determine overlapping dimming bands of the first dimming bands and the second dimming bands based on the position, and
adjust an electrical parameter applied to the overlapping dimming bands maintain the light intensity.

2. The sunroof dimming system of claim 1, wherein the controller is configured to
control one or more of the first dimming bands to change a visual characteristic associated with the first dimmable panel, and
control one or more of the second dimming bands to change a visual characteristic associated with the second dimmable panel.

3. The sunroof dimming system of claim 2, wherein the first dimming bands or the second dimming bands are rectangular.

4. The sunroof dimming system of claim 1, wherein the controller is configured to increase a transparency associated with the first panel or a transparency associated with the second panel in response to the sunroof changing from the closed state to the open state.

5. The sunroof dimming system of claim 1, wherein the controller is configured to decrease a transparency associated with the first panel or a transparency associated with the second panel in response to the sunroof changing from the open state to the closed state.

6. An apparatus, comprising:
a sunroof controller configured to:
control dimming of a first panel of a sunroof of a vehicle cabin and a second panel of the sunroof of the vehicle cabin,
move, via a motor, the first panel relative to the second panel from a first position to a second position in which the first panel at least partially overlaps with the second panel, each of the first and second panels in a first visual state when the first panel is in the first position,
adjust dimming of the first and second panels such that, when the first panel is in the second position, each of the first and second panels is in a second visual state different relative to the first visual state,
determine an overlapping portion of the first panel and the second panel when in the second position, and
adjust an electrical parameter applied to the overlapping portion maintain a light intensity of an external light of the vehicle cabin.

7. The apparatus of claim 6, wherein the sunroof controller is configured to:
detect the light intensity within the vehicle cabin via a sensor when the first panel is in the first and second positions; and
adjust a first electrical parameter applied to the first panel and a second electrical parameter applied to the second panel based on the light intensity to maintain the light intensity.

8. The apparatus of claim 6, wherein the sunroof controller is configured to:
calculate a first adjustment associated with increasing a transparency of the first panel;
calculate a second adjustment associated with increasing a transparency of the second panel; and
control the first panel and the second panel based on the respective first and second adjustments to maintain the light intensity within the vehicle cabin in response to the sunroof changing from a closed state to an open state.

9. The apparatus of claim 8, wherein the first adjustment includes increasing a first voltage applied to the first panel, and wherein the second adjustment includes increasing a second voltage applied to the second panel.

10. The apparatus of claim 6, wherein the sunroof controller is configured to:
determine a first area of the first panel and a second area of the second panel that are to overlap with each other when the first panel is in the second position; and
adjust a first electrical parameter applied to the first area and a second electrical parameter applied to the second area to maintain the light intensity in response to the sunroof changing from a closed state to an open state.

11. A tangible machine-readable storage medium including instructions that, when executed, cause a processor to at least:
control dimming of a first panel of a sunroof of a vehicle cabin and a second panel of the sunroof of the vehicle cabin;
move, via a motor, the first panel relative to the second panel from a first position to a second position in which the first panel at least partially overlaps with the second panel, each of the first and second panels in a first visual state when the first panel is in the first position;
adjust dimming of the first and second panels such that, when the first panel is in the second position, each of the first and second panels is in a second visual state different relative to the first visual state;
determine an overlapping portion of the first panel and the second panel when in the second position, and
adjust an electrical parameter applied to the overlapping portion maintain a light intensity of an external light of the vehicle cabin.

12. The tangible machine-readable storage medium of claim 11, wherein the instructions cause the processor to:
detect the light intensity within the vehicle cabin via a sensor when the first panel is in the first and second positions; and
adjust a first electrical parameter applied to the first panel and a second electrical parameter applied to the second panel based on the light intensity to maintain the light intensity.

13. The tangible machine-readable storage medium of claim 11, wherein the instructions cause the processor to:

calculate a first adjustment associated with increasing a transparency of the first panel;

calculate a second adjustment associated with increasing a transparency of the second panel; and control the first panel and the second panel based on the respective first and second adjustments to maintain the light intensity within the vehicle cabin in response to the sunroof changing from a closed state to an open state.

14. The tangible machine-readable storage medium of claim 13, wherein the first adjustment includes increasing a first voltage applied to the first panel, and wherein the second adjustment includes increasing a second voltage applied to the second panel.

15. The tangible machine-readable storage medium of claim 11, wherein the instructions cause the processor to:

determine a first area of the first panel and a second area of the second panel that are to overlap with each other when the first panel is in the second position; and adjust a first electrical parameter applied to the first area and a second electrical parameter applied to the second area to maintain the light intensity associated with the vehicle cabin when the first panel is in the first and second positions.

* * * * *